US008711129B2

(12) United States Patent
Hotelling et al.

(10) Patent No.: US 8,711,129 B2
(45) Date of Patent: Apr. 29, 2014

(54) MINIMIZING MISMATCH DURING COMPENSATION

(75) Inventors: Steve Porter Hotelling, San Jose, CA (US); Brian Richards Land, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 1362 days.

(21) Appl. No.: 11/650,038

(22) Filed: Jan. 3, 2007

(65) Prior Publication Data

US 2008/0158175 A1 Jul. 3, 2008

(51) Int. Cl.
*G09G 5/00* (2006.01)
(52) U.S. Cl.
USPC ........ 345/178; 345/173; 345/174; 178/18.01; 178/18.06
(58) Field of Classification Search
USPC ............. 345/173–179, 156; 178/18.01–18.11
See application file for complete search history.

(56) References Cited

U.S. PATENT DOCUMENTS

| | | | |
|---|---|---|---|
| 4,090,408 A | 5/1978 | Hedrick | |
| 4,415,927 A | 11/1983 | Penney | |
| 4,988,983 A * | 1/1991 | Wehrer | 345/175 |
| 5,149,919 A | 9/1992 | Greanias | |
| 5,483,261 A | 1/1996 | Yasutake | |
| 5,488,204 A | 1/1996 | Mead et al. | |
| 5,508,656 A | 4/1996 | Jaffard et al. | |
| 5,565,658 A * | 10/1996 | Gerpheide et al. | 178/18.02 |
| 5,825,352 A | 10/1998 | Bisset et al. | |
| 5,835,079 A | 11/1998 | Shieh | |
| 5,880,411 A | 3/1999 | Gillespie et al. | |
| 5,920,309 A * | 7/1999 | Bisset et al. | 345/173 |
| 6,049,246 A | 4/2000 | Kozisek et al. | |
| 6,087,897 A | 7/2000 | Wang | |
| 6,140,872 A | 10/2000 | McEldowney | |
| 6,141,169 A | 10/2000 | Pietruszynski et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |

(Continued)

FOREIGN PATENT DOCUMENTS

DE 10 2005 038875 A1 11/2006
JP 2000/163031 A 6/2000

(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Jennifer Nguyen
(74) *Attorney, Agent, or Firm* — Morrison & Foerster LLP

(57) ABSTRACT

A method and apparatus for minimizing mismatch effects between a compensation signal and an output signal generated by a touch surface device is disclosed. In one embodiment the apparatus includes a touch-sensitive panel having a sense node for providing an output signal indicative of a touch or no-touch condition on the panel; a drive circuit for generating a sinusoidal drive signal provided to the sense node of the touch-sensitive panel; at least one non-touch-sensitive node within the touch-sensitive panel, for generating a sinusoidal compensation signal, wherein the sinusoidal compensation signal is summed with the output signal to provide a sinusoidal compensated output signal; and a sensing circuit for receiving the sinusoidal compensated output signal.

34 Claims, 13 Drawing Sheets

(56) References Cited

U.S. PATENT DOCUMENTS

| | | |
|---|---|---|
| 6,466,036 B1 | 10/2002 | Philipp |
| 6,570,557 B1 | 5/2003 | Westerman et al. |
| 6,677,932 B1 | 1/2004 | Westerman |
| 6,690,387 B2 | 2/2004 | Zimmerman et al. |
| 6,781,450 B1 | 8/2004 | Mercer et al. |
| 6,888,536 B2 | 5/2005 | Westerman et al. |
| 7,015,894 B2 | 3/2006 | Morohoshi |
| 7,132,882 B2 | 11/2006 | Chen et al. |
| 7,138,856 B2 | 11/2006 | Laletin |
| 7,184,064 B2 | 2/2007 | Zimmerman et al. |
| 7,253,680 B2 | 8/2007 | Laletin |
| 7,277,087 B2 | 10/2007 | Hill et al. |
| 7,304,534 B2 | 12/2007 | Koller et al. |
| 7,315,300 B2 | 1/2008 | Hill et al. |
| 7,327,190 B2 | 2/2008 | D'Abramo et al. |
| RE40,153 E | 3/2008 | Westerman et al. |
| 7,339,580 B2 | 3/2008 | Westerman et al. |
| 7,557,590 B2 | 7/2009 | Yakabe |
| RE40,993 E | 11/2009 | Westerman |
| 7,614,008 B2 | 11/2009 | Ording |
| 7,663,607 B2 | 2/2010 | Hotelling et al. |
| 7,844,914 B2 | 11/2010 | Andre et al. |
| 8,049,732 B2 | 11/2011 | Hotelling et al. |
| 8,479,122 B2 | 7/2013 | Hotelling et al. |
| 8,553,004 B2 | 10/2013 | Hotelling et al. |
| 2002/0011991 A1 | 1/2002 | Iwasaki et al. |
| 2003/0067451 A1* | 4/2003 | Tagg et al. ............. 345/174 |
| 2004/0012439 A1 | 1/2004 | Chen et al. |
| 2005/0146513 A1 | 7/2005 | Hill et al. |
| 2005/0260965 A1 | 11/2005 | Ranganathan et al. |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0033724 A1 | 2/2006 | Chaudhri et al. |
| 2006/0053387 A1 | 3/2006 | Ording |
| 2006/0085757 A1 | 4/2006 | Andre et al. |
| 2006/0097991 A1 | 5/2006 | Hotelling et al. |
| 2006/0186954 A1 | 8/2006 | Koller et al. |
| 2006/0197753 A1 | 9/2006 | Hotelling |
| 2006/0232567 A1 | 10/2006 | Westerman et al. |
| 2007/0074913 A1* | 4/2007 | Geaghan et al. ............ 178/18.06 |
| 2007/0109274 A1* | 5/2007 | Reynolds ................ 345/173 |
| 2007/0291011 A1 | 12/2007 | Chang |
| 2008/0018618 A1 | 1/2008 | Hill et al. |
| 2008/0088595 A1* | 4/2008 | Liu et al. ................ 345/173 |
| 2008/0158172 A1 | 7/2008 | Hotelling et al. |
| 2008/0158178 A1* | 7/2008 | Hotelling et al. ............ 345/173 |
| 2008/0158180 A1 | 7/2008 | Krah et al. |
| 2008/0191713 A1 | 8/2008 | Hauer et al. |
| 2010/0073317 A1 | 3/2010 | Hasegawa |
| 2012/0038581 A1 | 2/2012 | Hotelling |

FOREIGN PATENT DOCUMENTS

| | | |
|---|---|---|
| JP | 2002-342033 A | 11/2002 |
| WO | WO-2006/132960 A1 | 12/2006 |
| WO | WO-2008/085419 A1 | 7/2008 |

OTHER PUBLICATIONS

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

International Search Report mailed May 8, 2008, for PCT Application No. PCT/US2007/026187, filed Dec. 21, 2007, two pages.

Non-Final Office Action mailed May 7, 2012, for U.S. Appl. No. 13/284,732, filed Oct. 28, 2011, 10 pages.

Notice of Allowance mailed Jul. 1, 2013, for U.S. Appl. No. 13/284,732, filed Oct. 28, 2011, 6 pages.

\* cited by examiner

MINIMIZING MISMATCH DURING COMPENSATION

FIELD OF THE INVENTION

This disclosure relates generally to electronic devices (e.g., a touch screen) capable of generating a dynamic output signal, and more particularly, to a method and system of compensating for undesired portions (e.g., a static portion) of the output signal.

BACKGROUND OF THE INVENTION

One example of an electronic device that generates dynamic output signals is a user input device for performing operations in a computer system. Such input devices generate output signals based on user operation of the device or user data or commands entered into the device. The operations generally correspond to moving a cursor and/or making selections on a display screen. By way of example, the input devices may include buttons or keys, mice, trackballs, touch pads, joy sticks, touch screens and the like. Touch pads and touch screens (collectively "touch surfaces") are becoming increasingly popular because of their ease and versatility of operation as well as to their declining price. Touch surfaces allow a user to make selections and move a cursor by simply touching the surface, which may be a pad or the display screen, with a finger, stylus, or the like. In general, the touch surface recognizes the touch and position of the touch and the computer system interprets the touch and thereafter performs an action based on the touch.

Touch pads are well-known and ubiquitous today in laptop computers, for example, as a means for moving a cursor on a display screen. Such touch pads typically include a touch-sensitive opaque panel which senses when an object (e.g., finger) is touching portions of the panel surface. Touch screens are also well known in the art. Various types of touch screens are described in applicant's co-pending patent application Ser. No. 10/840,862, entitled "Multipoint Touchscreen," filed May 6, 2004, which is hereby incorporated by reference in its entirety. As noted therein, touch screens typically include a touch-sensitive panel, a controller and a software driver. The touch-sensitive panel is generally a clear panel with a touch sensitive surface. The touch-sensitive panel is positioned in front of a display screen so that the touch sensitive surface covers the viewable area of the display screen. The touch-sensitive panel registers touch events and sends these signals to the controller. The controller processes these signals and sends the data to the computer system. The software driver translates the touch events into computer events. There are several types of touch screen technologies including resistive, capacitive, infrared, surface acoustic wave, electromagnetic, near field imaging, etc. Each of these devices has advantages and disadvantages that are taken into account when designing or configuring a touch screen.

In conventional touch surface devices, and other types of input devices, there is typically an operational amplifier that amplifies the output signal of the device. The output signal is a dynamic signal in that it changes between two or more states (e.g., a "touch" or "no touch" condition). In conventional devices, the amplifier may be followed by an output signal compensation circuit that provides a compensation signal to offset an undesired portion (e.g., static portion) of the output signal. The problem with this configuration is that the amplifier amplifies both the dynamic signal of interest as well as the undesired static or offset portion.

Additionally, by compensating the output signal after it has been amplified, conventional compensation methods provide poor utilization of the output dynamic range of the amplifier, which results in poor sensitivity in detecting dynamic changes in the output signal.

Furthermore, in devices wherein the output signal is a charge waveform (e.g., an output signal from a capacitive touch surface), a relatively large feedback capacitor is typically connected between the output of the amplifier and the inverting input of the amplifier in order to accommodate relatively large charge amplitudes at the inverting input of the amplifier. The charge amplitudes should be sufficiently large to provide a sufficiently high signal-to-noise (S/N) ratio. The large feedback capacitors, however, consume a significant amount of integrated circuit (IC) chip "real estate" and hence, add significant costs and size requirements to the IC chips.

It has been found that the mutual capacitance ($C_{SIG}$) across sensing nodes (a.k.a., pixels) will vary across a touch surface panel because of the geometrical and physical properties of the panel and a variety of other manufacturing tolerance related factors. Therefore, a constant compensation signal does not provide optimized compensation to every pixel output. Additionally, the touch surface electrodes can impose a phase delay on the drive or stimulus waveform passing through it. For transparent panels utilizing Indium Tin Oxide (ITO) conductive traces, for example, the resistive component may be large and varies depending on pixel location within the panel and the physical geometries of the ITO traces which connect the pixels to the sensing circuitry. For higher resistance values, a significant time (phase) delay in the propagation of the stimulus voltage through the panel may occur. This phase delay causes the output signals from the panel to be delayed before entering an amplifier, for example.

SUMMARY OF THE INVENTION

The invention addresses the above and other needs by providing a new method and system for compensating for undesired portions (i.e., "offset portions") of an output signal. In various embodiments, the invention is utilized in connection with a touch surface device, wherein offset compensation is adjusted based on the location of the sense node or pixel currently being sensed so as to provide a compensation signal that is adjusted based on variations in an output signal generated by each pixel. In alternative embodiments, compensation adjustment may be performed on a per-pixel, per-row and/or per-column basis.

In a further embodiment, both the compensation signals and the drive signals applied to the drive electrodes of a touch surface panel are generated to be sinusoidal waveforms so as to minimize the effects of any phase mismatches between the resulting sinusoidal output signals from each pixel and the corresponding sinusoidal waveforms used to compensate the output signals.

In one embodiment, a per-pixel adjusted compensation signal is summed with an output signal from a touch surface panel prior to applying the compensated signal to the input of an amplifier. In other embodiments, the adjusted compensation signal may be summed with the output of the amplifier.

In further embodiments, the waveform, amplitude, frequency and/or phase of compensation signal is adjusted to match the variance of $C_{SIG}$ on a per-pixel, per-row and/or per-column basis. This allows signal compensation to be performed to optimize the performance of each pixel, row or column. The adjustment of the compensation signal is performed by programming a look-up table to provide a different digital code to a register located in the look-up table, depending on which row, column and/or pixel is currently being sensed. The digital code is read by a digital-to-analog converter (DAC) to generate an analog compensation signal having an amplitude, frequency and waveform and/or phase corresponding to the unique digital value stored in register.

In a further embodiment, a compensation signal is generated by one or more capacitive nodes on a touch surface device that are insensitive to touch. A compensation drive signal, provided to one or more touch-insensitive nodes, is substantially 180 degrees out of phase with the drive signal provided to the touch-sensitive nodes of the touch surface device. In this embodiment, mismatches between the phase of the compensation signal and the drive signal are minimized by providing a drive signal and compensation signal having a sinusoidal waveform instead of a square waveform.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the present invention. Furthermore, although embodiments of the present invention are described herein in terms of devices and applications compatible with computer systems and devices manufactured by Apple Computer, Inc. of Cupertino, Calif., such embodiments are illustrative only and should not be considered limiting in any respect.

Figure 1:
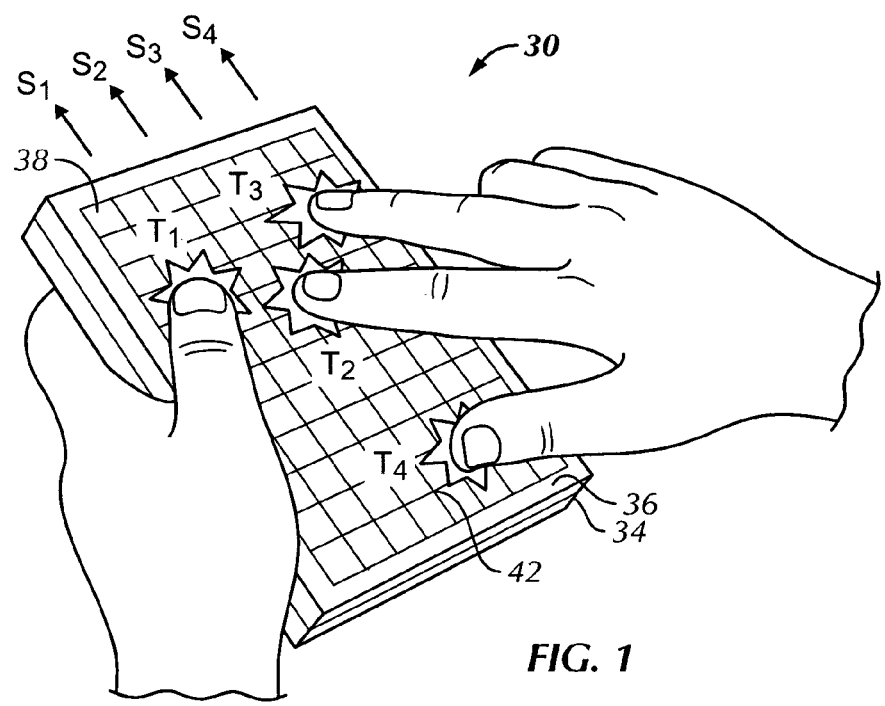
FIG. 1 is a perspective view of a touch surface device capable utilizing an improved output signal compensation circuit and method, in accordance with one embodiment of the invention.

FIG. 1 is a perspective view of a touch screen display arrangement 30, which includes a display 34 and a transparent touch screen 36 positioned in front of display 34. Display 34 may be configured to display a graphical user interface (GUI) including perhaps a pointer or cursor as well as other information to the user. Transparent touch screen 36 is an input device that is sensitive to a user's touch, allowing a user to interact with the graphical user interface on display 34. In general, touch screen 36 recognizes touch events on surface 38 of touch screen 36 and thereafter outputs this information to a host device. The host device may, for example, correspond to a computer such as a desktop, laptop, handheld or tablet computer, audio/video player or cellular telephone. The host device interprets the touch event and thereafter performs an action based on the touch event.

In one embodiment, touch screen 36 is configured to recognize multiple touch events that occur simultaneously at different locations on touch sensitive surface 38. That is, touch screen 36 allows for multiple contact points T1-T4 to be tracked simultaneously. Touch screen 36 generates separate tracking signals S1-S4 for each touch point T1-T4 that occurs on the surface of touch screen 36 at the same time. In one embodiment, the number of recognizable touches may be about fifteen which allows for a user's ten fingers and two palms to be tracked along with three other contacts. The multiple touch events can be used separately or together to perform singular or multiple actions in the host device. Numerous examples of multiple touch events used to control a host device are disclosed in U.S. Pat. Nos. 6,323,846; 6,888,536; 6,677,932; 6,570,557, and co-pending U.S. patent application Ser. Nos. 11/015,434; 10/903,964; 11/048,264; 11/038,590; 11/228,758; 11/228,700; 11/228,737; 11/367,749, each of which is hereby incorporated by reference in its entirety.

Figure 2:
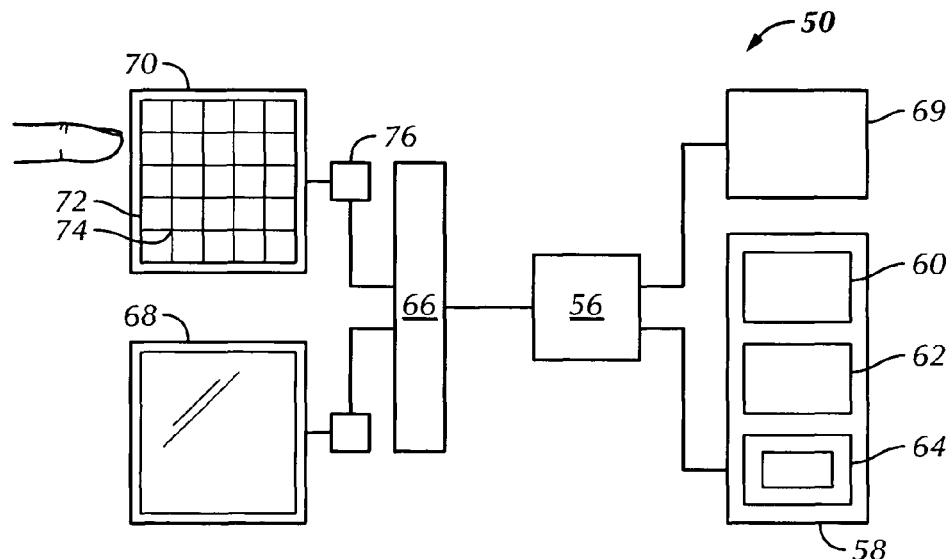
FIG. 2 is a block diagram of a computing device or system incorporating a touch surface device, in accordance with one embodiment of the invention.

FIG. 2 is a block diagram of a computer system 50, employing a multi-touch touch screen. Computer system 50 may be, for example, a personal computer system such as a desktop, laptop, tablet, handheld computer, cellular telephone or audio/video player. The computer system could also be a public computer system such as an information kiosk, automated teller machine (ATM), point of sale machine (POS), industrial machine, gaming machine, arcade machine, vending machine, airline e-ticket terminal, restaurant reservation terminal, customer service station, library terminal, learning device, etc.

Computer system 50 includes a processor 56 configured to execute instructions and to carry out operations associated with the computer system 50. Computer code and data required by processor 56 are generally stored in storage block 58, which is operatively coupled to processor 56. Storage block 58 may include read-only memory (ROM) 60, random access memory (RAM) 62, hard disk drive 64, and/or removable storage media such as CD-ROM, PC-card, floppy disks, and magnetic tapes. Any of these storage devices may also be accessed over a network. Computer system 50 also includes a display device 68 that is operatively coupled to the processor 56. Display device 68 may be any of a variety of display types including liquid crystal displays (e.g., active matrix, passive matrix, etc.), cathode ray tubes (CRT), plasma displays, etc.

Computer system 50 also includes touch screen 70, which is operatively coupled to the processor 56 by I/O controller 66 and touch screen controller 76. (The I/O controller 66 may be integrated with the processor 56, or it may be a separate component.) In any case, touch screen 70 is a transparent panel that is positioned in front of the display device 68, and may be integrated with the display device 68 or it may be a separate component. Touch screen 70 is configured to receive input from a user's touch and to send this information to the processor 56. In most cases, touch screen 70 recognizes touches and the position and magnitude of touches on its surface.

The host processor 561 receives outputs from the touch screen controller 76 and performs actions based on the outputs. Such actions may include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. The host processor 76 may also perform additional functions that may not be related to multi-touch (MT) panel processing, and may be coupled to program storage 58 and the display device 68 such as an LCD display for providing a user interface (UI) to a user of the device.

In one embodiment, the touch screen panel 70 can be implemented as a mutual capacitance device constructed as described below with reference to FIGS. 3A and 3B. In this embodiment, the touch screen panel 70 is comprised of a two-layered electrode structure, with driving lines or electrodes on one layer and sensing lines or electrodes on the other. In either case, the layers are separated by a dielectric material (not shown). In the Cartesian arrangement of FIG. 3A, one layer is comprised of N horizontal, preferably equally spaced row electrodes 81, while the other layer is comprised of M vertical, preferably equally spaced column electrodes 82. In a polar arrangement, illustrated in FIG. 3B, the sensing lines may be concentric circles and the driving lines may be radially extending lines (or vice versa). As will be appreciated by those skilled in the art, other configurations based on a variety of coordinate systems are also possible. Additionally, it is understood that the invention is not necessarily limited to touch surface devices utilizing mutual capacitance sensing nodes. The invention may be implemented within other types of touch surface devices such as "self capacitance" devices, for example.

Each intersection 83 represents a pixel and has a characteristic mutual capacitance, $C_{SIG}$. A grounded object (such as a finger) that approaches a pixel 83 from a finite distance shunts the electric field between the row and column intersection, causing a decrease in the mutual capacitance $C_{SIG}$ at that location. In the case of a typical sensor panel, the typical signal capacitance $C_{SIG}$ is about 1.0 picofarads (pF) and the change ($\Delta C_{SIG}$) induced by a finger touching a pixel, is about 0.10 pF. These capacitance values are exemplary only and should not in any way limit the scope of the present invention.

The electrode material may vary depending on the application. In touch screen applications, the electrode material may be ITO (Indium Tin Oxide) on a glass substrate. In a touch tablet, which need not be transparent, copper on an FR4 substrate may be used. The number of sensing points 83 may also be widely varied. In touch screen applications, the number of sensing points 83 generally depends on the desired sensitivity as well as the desired transparency of the touch screen 70. More nodes or sensing points generally increases sensitivity, but reduces transparency (and vice versa).

During operation, each row electrode (i.e., a drive electrode) is sequentially charged by driving it with a predetermined voltage waveform (discussed in greater detail below). The charge capacitively couples to the column electrodes (i.e., sense electrodes) at the intersections between the drive electrode and the sense electrodes. In alternative embodiments the column electrodes can be configured as the drive electrodes and the row electrodes can be configured as the sense electrodes. The capacitance of each intersection 83 is measured to determine the positions of multiple objects when they touch the touch surface. Sensing circuitry monitors the charge transferred and time required to detect changes in capacitance that occur at each node. The positions where changes occur and the magnitude of those changes are used to identify and quantify the multiple touch events.

Figure 4:
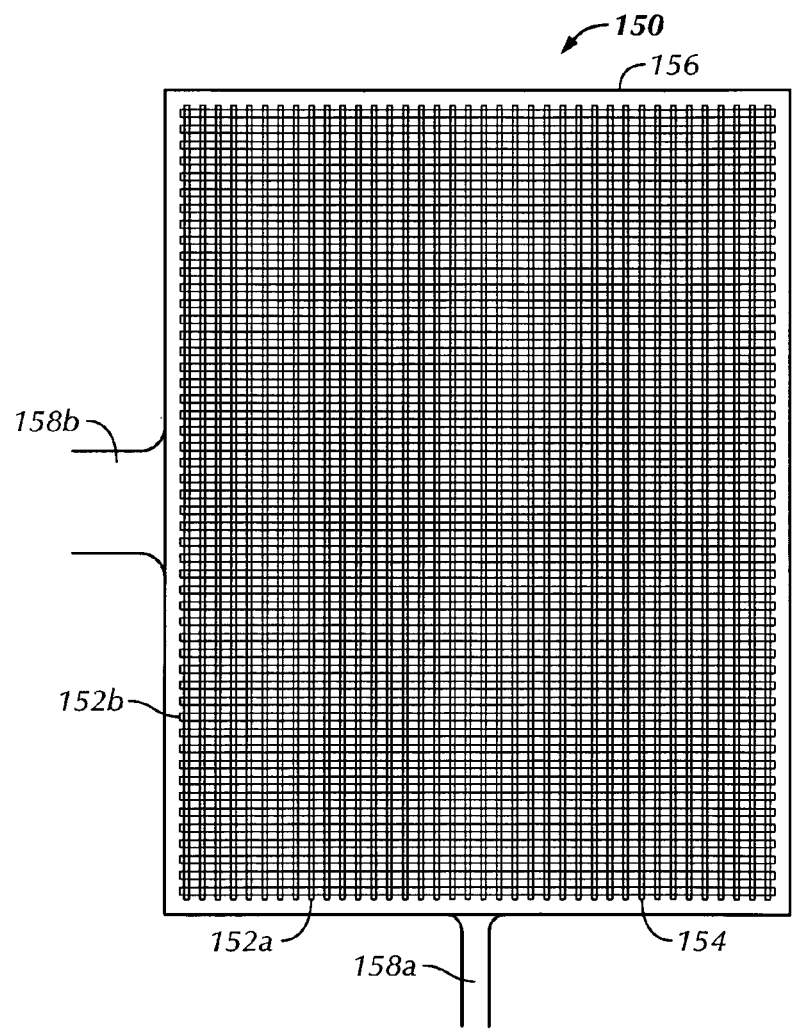
FIG. 4 is a perspective top view of transparent multipoint touch screen, in accordance with one embodiment of the present invention.

FIG. 4 is a top view of a transparent multipoint touch screen 150, in accordance with one embodiment of the present invention. As shown, the touch screen 150 includes a two layer grid of spatially separated lines or wires 152. In most cases, the lines 152 on each layer are parallel one another. Furthermore, although in different planes, the lines 152 on the different layers are configured to intersect or cross in order to produce capacitive sensing nodes 154 (a.k.a., "pixels"), which each represent different coordinates in the plane of the touch screen 150. The nodes 154 are configured to receive capacitive input from an object touching the touch screen 150 in the vicinity of the node 154. When an object (e.g., a finger tip) is proximate the node 154, the object steals charge thereby affecting the capacitance at the node 154. It has been found that as a finger is pressed more firmly against the touch screen surface 150, the surface area of the finger touching the touch screen 150 increases and a greater amount of charge is diverted away from the underlying sensing node(s) 154.

The lines 152 on different layers serve two different functions. One set of lines 152A drives a current therethrough while the second set of lines 152B senses the capacitance coupling at each of the nodes 154. In most cases, the top layer provides the driving lines 152A while the bottom layer provides the sensing lines 152B. The driving lines 152A are connected to a voltage source (not shown) that separately drives the current through each of the driving lines 152A. That is, the stimulus is only happening over one line while all the other lines are grounded. They may be driven similarly to a raster scan. Each sensing line 152B is connected to a capacitive sensing circuit (not shown) that senses a charge and, hence, capacitance level for the sensing line 152B.

When driven, the charge on the driving line 152A capacitively couples to the intersecting sensing lines 152B through the nodes 154 and the capacitive sensing circuits sense their corresponding sensing lines 152B in parallel. Thereafter, the next driving line 152A is driven, and the charge on the next driving line 152A capacitively couples to the intersecting sensing lines 152B through the nodes 154 and the capacitive sensing circuits sense all of the sensing lines 152B in parallel. This happens sequentially until all the lines 152A have been driven. Once all the lines 152A have been driven, the sequence starts over (continuously repeats). As explained in further detail below, in one embodiment, the capacitive sensing circuits are fabricated on an application specific integrated circuit (ASIC), which converts analog capacitive signals to digital data and thereafter transmit the digital data over a serial bus to a host controller or microprocessor for processing.

The lines 152 are generally disposed on one or more optical transmissive members 156 formed from a clear material such as glass or plastic. By way of example, the lines 152 may be placed on opposing sides of the same member 156 or they may be placed on different members 156. The lines 152 may be placed on the member 156 using any suitable patterning technique including for example, deposition, etching, printing and the like. Furthermore, the lines 152 can be made from any suitable transparent conductive material. By way of example, the lines may be formed from indium tin oxide (ITO). The driving lines 152A may be coupled to the voltage source through a flex circuit 158A, and the sensing lines 152B may be coupled to the sensing circuits via a flex circuit 158B. The sensor ICs may be attached to a printed circuit board (PCB).

The distribution of the lines 152 may be widely varied. For example, the lines 152 may be positioned almost anywhere in the plane of the touch screen 150. The lines 152 may be positioned randomly or in a particular pattern about the touch screen 150. With regards to the later, the position of the lines 152 may depend on the coordinate system used. For example, the lines 152 may be placed in rows and columns for Cartesian coordinates or concentrically and radially for polar coordinates. When using rows and columns, the rows and columns may be placed at various angles relative to one another. For example, they may be vertical, horizontal or diagonal.

Figure 5:
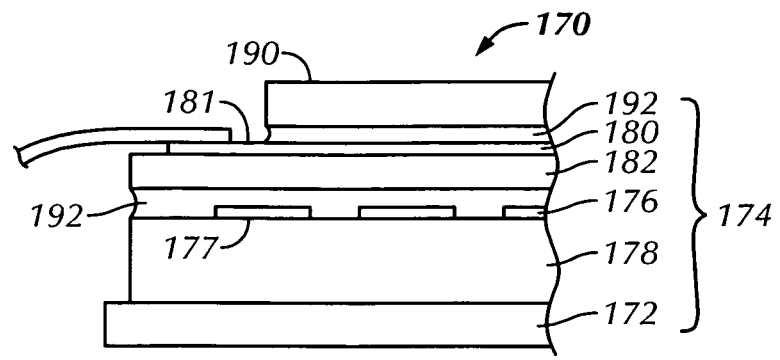
FIG. 5 is a partial front elevation view, in cross section of a display arrangement, in accordance with one embodiment of the present invention.

FIG. 5 is a partial front elevation view, in cross section of an exemplary display arrangement 170. The display arrangement 170 includes an LCD display 172 and a touch screen 174 positioned over the LCD display 172. The touch screen may for example correspond to the touch screen shown in FIG. 4. The LCD display 172 may correspond to any conventional LCD display known in the art. Although not shown, the LCD display 172 typically includes various layers including a fluorescent panel, polarizing filters, a layer of liquid crystal cells, a color filter and the like.

The touch screen 174 includes a transparent sensing layer 176 that is positioned over a first glass member 178. The sensing layer 176 includes a plurality of sensor lines 177 positioned in columns (which extend in and out of the page). The first glass member 178 may be a portion of the LCD display 172 or it may be a portion of the touch screen 174. For example, it may be the front glass of the LCD display 172 or it may be the bottom glass of the touch screen 174. The sensor layer 176 is typically disposed on the glass member 178 using suitable transparent conductive materials and patterning techniques. In some cases, it may be desirable to coat the sensor layer 176 with material of similar refractive index to improve the visual appearance, i.e., make more uniform.

The touch screen 174 also includes a transparent driving layer 180 that is positioned over a second glass member 182. The second glass member 182 is positioned over the first glass member 178. The sensing layer 176 is therefore sandwiched between the first and second glass members 178 and 182. The second glass member 182 provides an insulating layer between the driving and sensing layers 176 and 180. The driving layer 180 includes a plurality of driving lines 181 positioned in rows (which extend to the right and left of the page). The driving lines 181 are configured to intersect or cross the sensing lines 177 positioned in columns in order to form a plurality of capacitive coupling nodes 182. Like the sensing layer 176, the driving layer 180 is disposed on the glass member 182 using suitable materials and patterning techniques. Furthermore, in some cases, it may be necessary to coat the driving layer 180 with material of similar refractive index to improve the visual appearance. Although the sensing layer is typically patterned on the first glass member, it should be noted that in some cases it may be alternatively or additionally patterned on the second glass member.

The touch screen 174 also includes a protective cover sheet 190 disposed over the driving layer 180. The driving layer 180 is therefore sandwiched between the second glass member 182 and the protective cover sheet 190. The protective cover sheet 190 serves to protect the under layers and provide a surface for allowing an object to slide thereon. The protective cover sheet 190 also provides an insulating layer between the object and the driving layer 180. The protective cover sheet is suitably thin to allow for sufficient coupling. The protective cover sheet 190 may be formed from any suitable clear material such as glass and plastic. In addition, the protective cover sheet 190 may be treated with coatings to reduce friction or sticking when touching and reduce glare when viewing the underlying LCD display 172. By way of example, a low friction/anti reflective coating may be applied over the cover sheet 190. Although the line layer is typically patterned on a glass member, it should be noted that in some cases it may be alternatively or additionally patterned on the protective cover sheet.

The touch screen 174 also includes various bonding layers 192. The bonding layers 192 bond the glass members 178 and 182 as well as the protective cover sheet 190 together to form the laminated structure and to provide rigidity and stiffness to the laminated structure. In essence, the bonding layers 192 help to produce a monolithic sheet that is stronger than each of the individual layers taken alone. In most cases, the first and second glass members 178 and 182 as well as the second glass member and the protective sheet 182 and 190 are laminated together using a bonding agent such as glue. The compliant nature of the glue may be used to absorb geometric variations so as to form a singular composite structure with an overall geometry that is desirable. In some cases, the bonding agent includes an index matching material to improve the visual appearance of the touch screen 170.

Figure 6:
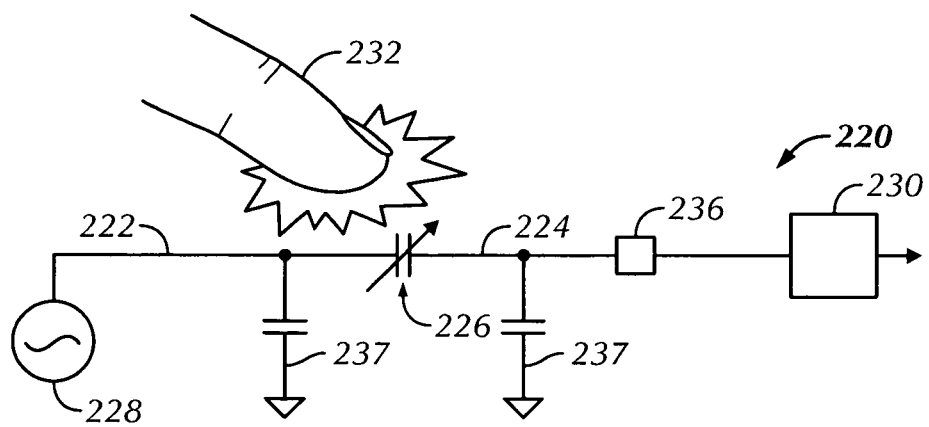
FIG. 6 is a simplified diagram of a mutual capacitance circuit, in accordance with one embodiment of the present invention.

FIG. 6 is a simplified diagram of a mutual capacitance circuit 220, in accordance with one embodiment of the present invention. The mutual capacitance circuit 220 includes a driving line 222 and a sensing line 224 that are spatially separated by a capacitive coupling node 226. The driving line 222 is electrically coupled to a voltage source 228, and the sensing line 224 is electrically coupled to a capacitive sensing circuit 230. The driving line 222 is configured to carry a current to the capacitive coupling node 226, and the sensing line 224 is configured to carry a current to the capacitive sensing circuit 230. When no object is present, the capacitive coupling at the node 226 stays fairly constant. When an object 232 such as a finger is placed proximate the node 226, the capacitive coupling through the node 226 changes. The object 232 effectively shunts some of the electromagnetic field away so that the charge formed across the node 226 decreases. The change in capacitive coupling changes the current that is carried by the sensing lines 224. The capacitive sensing circuit 230 notes the current change and the position of the node 226 where the current change occurred and reports this information in a raw or in some processed form to a host controller or microprocessor. Such sensing occurs for each node at a rapid scan rate so that from the perspective of a user it appears that all nodes are sensed simultaneously.

In one embodiment, the capacitive sensing circuit 230 includes an input filter 236 for eliminating parasitic or stray capacitance 237, which may for example be created by the large surface area of the row and column lines relative to the other lines and the system enclosure at ground potential. Generally speaking, the filter rejects stray capacitance effects so that a clean representation of the charge transferred across the node 226 is outputted. That is, the filter 236 produces an output that is not dependent on the parasitic or stray capacitance, but rather on the capacitance at the node 226. As a result, a more accurate output is produced.

Figure 7:
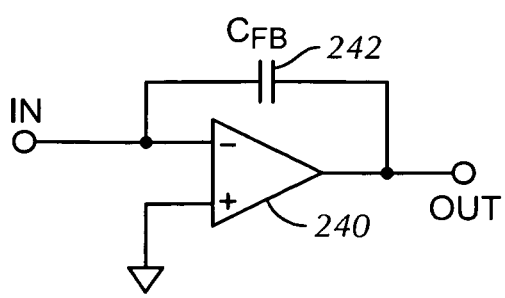
FIG. 7 is a diagram of a charge amplifier, in accordance with one embodiment of the present invention.

FIG. 7 is a diagram of a charge amplifier 240 that may be used as the filter 236, in accordance with one embodiment of the present invention. As shown, the amplifier includes a non inverting input that is held at a constant voltage (e.g., a reference voltage or ground), an inverting input that is coupled to the node 226. The output of the amplifier 240 is coupled back to the inverting input through a feedback capacitor ($C_{FB}$) 242. As is known in the art, in this configuration, the amplifier 240 and $C_{FB}$ 242 eliminate stray capacitance that may otherwise effect the measurement of capacitance or change in capacitance ($\Delta C_{SIG}$) at the capacitive sensing node 226. Because of the characteristics of the amplifier 240, any charge that appears across $C_{STRAY}$ will be equal to the charge at the output of the amplifier and, therefore, no matter how much stray capacitance $C_{STRAY}$ is added to the inverting input, the net charge across $C_{SIG}$ will always be zero. In one embodiment, the inverting amplifier 240 in combination with the $C_{FB}$ 242 perform the following tasks: (1) charge to voltage conversion, (2) charge amplification, (3) rejection of stray capacitance present at the column electrode, (4) anti aliasing, and (5) gain equalization at different frequencies. Charge to voltage conversion is performed by the feedback capacitor $C_{FB}$ in the feedback path of the amplifier 240.

Figure 8:
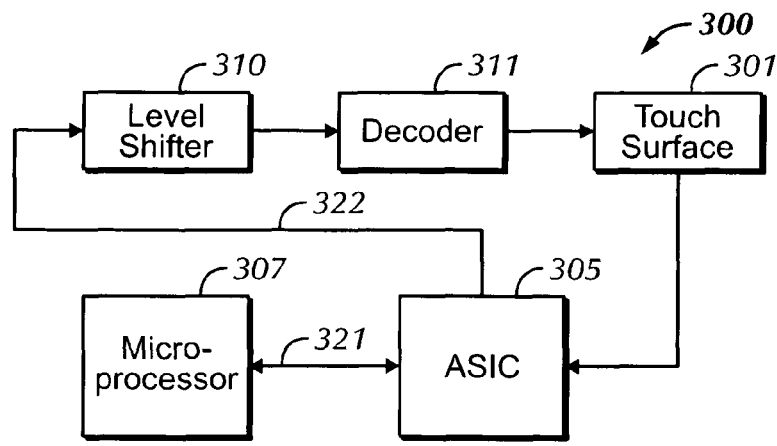
FIG. 8 is a block diagram of a touch surface device and controller system, in accordance with one embodiment of the present invention.

In one embodiment, the functions of driving each row electrode and sensing the charge transfer on each corresponding column electrode are performed by a multipoint touch screen controller system 300, as shown in FIG. 8. The controller system 100 includes a touch surface device 301 (e.g., a touch screen or touch pad), an application specific integrated circuit (ASIC) chip 305 for receiving output (e.g., touch data) from the touch surface 301, a microprocessor 307 for receiving and processing digital data from the ASIC 305, a level shifter or voltage multiplier 310 for generating drive signals of a desired amplitude, and a decoder 311 for decoding timing signals from the microprocessor and applying the drive signal to an appropriate row electrode.

The ASIC 305 receives analog signals (e.g., voltage waveforms) from each column electrode 82 (FIG. 3a) of the touch surface device 301 indicating a touch or no-touch condition at a respective capacitive sensing node 83 corresponding to an intersection of the column electrode 82 and a selected, driven row electrode 81 of the touch surface device 301. The ASIC 305 converts the analog signals received from the node 83 of the touch surface 301 into digital signals which are then received and processed by the microprocessor 307 in order to sense touch and/or multi-touch states. In one embodiment, the ASIC 305 contains a plurality of inverting amplifier 240 and feedback capacitor 242 circuits, similar to that shown in FIG. 7, each coupled to respective column electrodes of the touch surface device 301.

The ASIC 305 further generates all the drive waveforms necessary to scan the sensor panel and provides those waveforms to the level shifter 310, which amplifies the drive waveforms. The microprocessor 307 sends a clock signal 321 to set the timing of the ASIC 305, which in turn generates the appropriate timing waveforms 322 to create the row stimuli to the touch surface device 301. Decoder 311 decodes the timing signals to drive each row of the touch surface 301 in sequence. Level shifter 310 converts the timing signals 322 from the signaling level (e.g., 3.3 $V_{p-p}$) to the level used to drive the touch surface device 301 (e.g., 18$V_{p-p}$).

In one embodiment, it is desirable to drive the panel at multiple different frequencies for noise rejection purposes. Noise that exists at a particular drive frequency may not, and likely will not exist at the other frequencies. In one embodiment, each sensor panel row is stimulated with three bursts of twelve square wave cycles (50% duty-cycle, 18V amplitude), while the remaining rows are kept at ground. For better noise rejection, the frequency of each burst is different. Exemplary burst frequencies are 140 kHz, 200 kHz, and 260 Khz. A more detailed discussion of this "frequency hopping" method is provided in a commonly-owned and concurrently pending application Ser. No. 11/650,046, entitled "Scan Sequence Generator," filed concurrently herewith, the entirety of which is incorporated by reference herein.

During each burst of pulses, ASIC 305 takes a measurement of the column electrodes. This process is repeated for all remaining rows in the sensor panel. After all rows have been scanned in a single scan cycle, the measurement results are used to provide one or more images of the touch/no-touch state of the touch surface 301, each image taken at a different stimulus frequency. The images are stored in a memory (not shown) accessible by the microprocessor 307 and processed to determine a no-touch, touch or multi-touch condition.

Figure 9A:
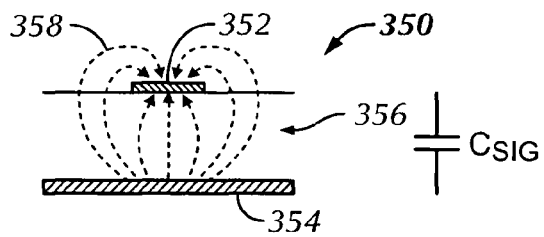
FIGS. 9A and 9B are perspective side views of an exemplary capacitive sensing node (a.k.a., pixel) in "no touch" and "touch" states, respectively, in accordance with one embodiment of the present invention.

FIG. 9A illustrates a side view of an exemplary sensing node (a.k.a., pixel) 350 in a steady-state (no-touch) condition. The node 350 is located at an intersection of a row electrode 352 and a column electrode 354, separated by a dielectric 356.

An electric field illustrated by electric field lines 358 between the column 354 and row 352 traces or electrodes create a mutual capacitance, $C_{SIG}$, between the row and column electrodes when a driving signal or stimulus is applied to the row electrode or trace 352.

Figure 9B:
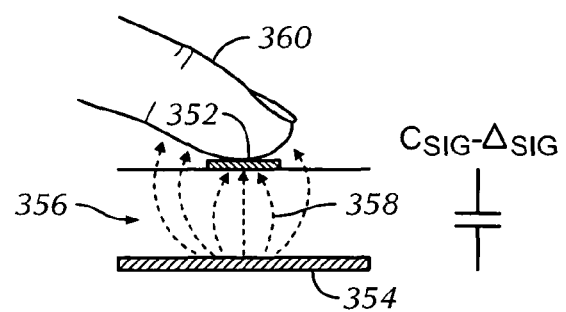

FIG. 9B is a side view of the exemplary node 350 in a dynamic (touch) condition. A user's finger 360, which has been placed on or near the node 350, blocks some of the electric field lines 358 between the row 352 and column 354 electrodes (those fringing fields that exit the dielectric and pass through the air above the row electrode). These electric field lines are shunted to ground through the capacitance inherent in the finger, and as a result, the steady state signal capacitance $C_{SIG}$ is reduced by $\Delta C_{SIG}$. Therefore, the signal capacitance at the node 350 becomes $C_{SIG}-\Delta C_{SIG}$, where $C_{SIG}$ represents the static (no touch) component and $\Delta C_{SIG}$ represents the dynamic (touch) component. Note that $C_{SIG}-\Delta C_{SIG}$ may always be nonzero due to the inability of a finger or other object to block all electric fields, especially those electric fields that remain entirely within the dielectric. In addition, it should be understood that as a finger is pushed harder or more completely onto the touch surface, the finger will tend to flatten and increase in surface area, thereby blocking more of the electric fields. Thus, $\Delta C_{SIG}$ may be variable and representative of how completely the finger is pushing down on the panel (i.e., a range from "no-touch" to "full-touch").

Figure 3A:
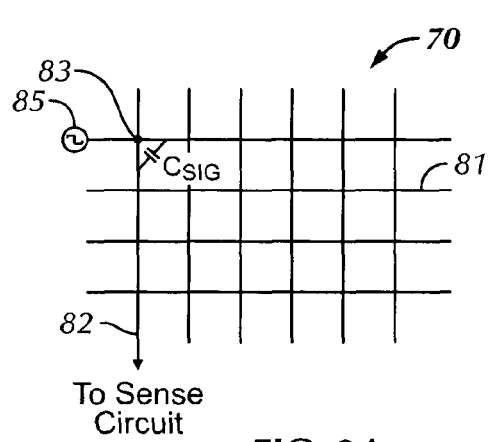
FIGS. 3A and 3B illustrate two possible arrangements of drive and sense electrodes in a touch screen, in accordance with various embodiments of the invention.
Figure 3B:
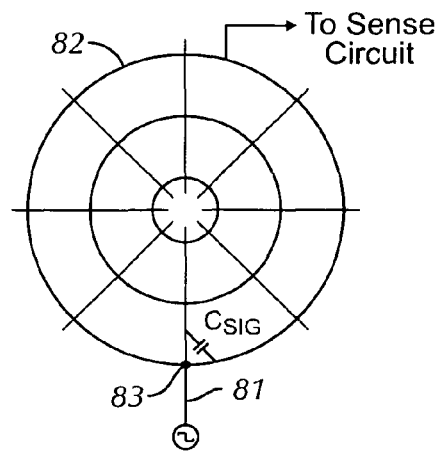
Figure 10A:
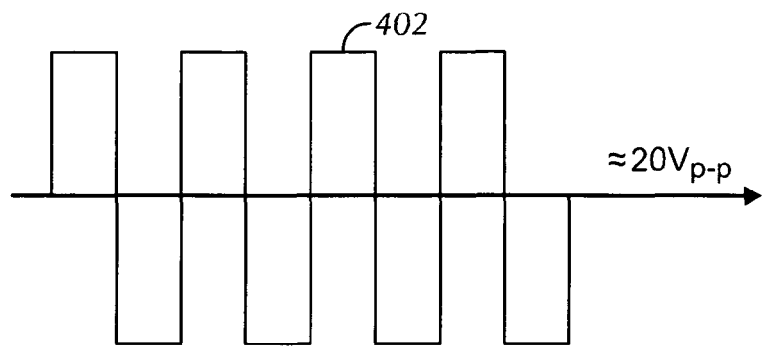
FIG. 10A illustrates an exemplary drive signal waveform applied to a selected drive (e.g., row) electrode of a touch surface panel, in accordance with one embodiment of the present invention.
Figure 10B:
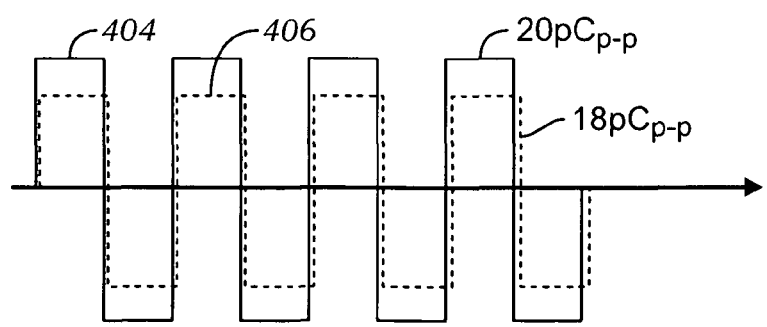
FIG. 10B illustrates exemplary charge output waveforms ("touch" and "no touch") generated by a sense (e.g., column) electrode of a touch surface panel, in accordance with one embodiment of the present invention.

FIG. 10A illustrates an exemplary driving signal waveform 402 that may be provided to a row electrode 81 (FIG. 3A). In this example, the driving signal is a square wave signal having a peak-to-peak amplitude of approximately 20 $V_{p-p}$. Since charge (Q) equals voltage (V) multiplied by capacitance (C), if the mutual capacitance ($C_{SIG}$) at a sensing node 83 is 1.0 pF, for example, the output at the corresponding column electrode 82 will be a square wave having an amplitude of 20 pico-coulombs peak-to-peak ($pC_{p-p}$) when viewed in the charge domain, as shown by solid line 404 in FIG. 10B. When a finger or other object comes in close proximity to the node 83, its mutual capacitance value will decrease to $C_{SIG}-\Delta C_{SIG}$, as discussed above. If, for example, the decreased capacitance $C_{SIG}-\Delta C_{SIG}=0.9$ pF, then the output at the column electrode 82 will be a square wave having a peak-to-peak amplitude of 18 $pC_{p-p}$, as indicated by the dashed waveform 406 in FIG. 10B (please note that these figures are not necessarily drawn to scale). Thus, the difference in charge output from a column electrode between a "no-touch" condition and a "touch" condition would be 20−18=2 $pC_{p-p}$ in this example.

Figure 11:
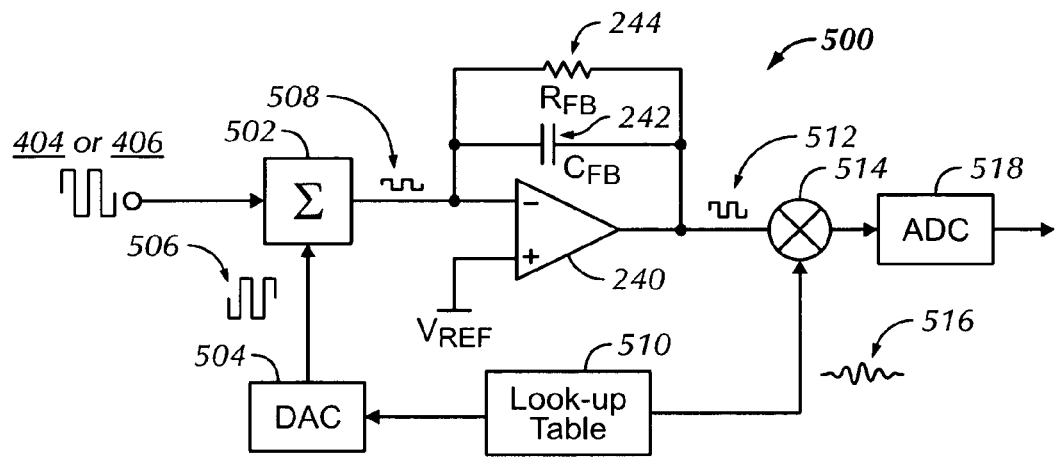
FIG. 11 is a diagram of an exemplary analog sensing circuit or channel with front-end compensation, in accordance with one embodiment of the present invention.

FIG. 11 illustrates a diagram of a capacitive sensing circuit 500 with front-end charge compensation, in accordance with one embodiment of the invention. Depending on whether a touch condition is being sensed at a respective capacitive sensing node, as described above, a charge waveform 404 (no touch) or 406 (touch) will be received at a first input of a signal summing circuit or multiplier 502. The sensing circuit 500 further includes a digital-analog-converter (DAC) 504 which provides a compensation waveform signal 506 to a second input of the multiplier 502. The compensation waveform signal 506 is generated to have substantially the same frequency as the charge waveform 404 or 406 but substantially 180 degrees out of phase with the charge waveform 404 or 406 outputted from the touch surface device 301 (FIG. 8). The amplitude of the compensation signal 506 may be selected to achieve any desired level of offset and/or amplitude range for the resulting compensated signal 508 outputted by the multiplier 502. In one embodiment, the peak-to-peak amplitude of the compensation signal 506 is selected to be the average of the amplitudes of waveforms 404 and 406. For example, if the amplitude of waveform 404 is 20 $pC_{p-p}$ and the amplitude of waveform 406 is 18 $pC_{p-p}$ (e.g., at full touch), the amplitude of the compensation waveform 506 would be selected to be 19 $pC_{p-p}$. Various advantages of selecting the amplitude of the compensation waveform 506 to be the average of the amplitudes of waveforms 404 and 406 are discussed in further detail below.

The capacitive sensing circuit 500 further includes a look-up table 510 that provides a digital signal to the DAC 504, which the DAC 504 converts into the desired compensation waveform 506, having a desired amplitude, shape, frequency and phase. Various embodiments of the DAC 504 are described in further detail below. In one embodiment, the look-up table 510 is pre-programmed to provide digital codes to the DAC 504 to generate predetermined compensation waveforms 506 corresponding to each drive signal frequency. A control signal 511 generated by row or channel scan logic circuitry (not shown) within the ASIC 305 controls what outputs will be provided to the DAC 504 and mixer 512 (described below). In various embodiments, the look-up table 510 may be implemented as one or more look-up tables residing in a memory of the ASIC 305. Thus, in the embodiment illustrated in FIG. 11, a front-end compensation circuit is provided that includes the summing circuit 502, the DAC 504 and the look-up table 510.

The compensated output signal 508 from the summing circuit 502 is provided to an inverting input of the operational amplifier 240. Since the compensated signal 508 is a charge waveform, the feedback capacitor 242 converts the charge waveform into a voltage waveform according to the equation $Q=C_{FB}V_{out}$, or $V_{out}=Q/C_{FB}$, where Q is the amplitude of the compensated waveform 508 and $V_{out}$ is the amplitude of the resulting voltage waveform 512 at the output of the amplifier 240. It is appreciated that since the peak-to-peak amplitude of the compensated waveform 508 (e.g., 0-2 $pC_{p-p}$) is significantly smaller than the amplitude of the uncompensated waveforms 404 or 406, the value of $C_{FB}$ may be significantly reduced (e.g., by a factor of 10-20 times) while maintaining desired voltage ranges (e.g., CMOS levels) for $V_{out}$ 512 at the output of the amplifier 240. For example, to achieve a dynamic range of 1 volt, peak-to-peak ($V_{p-p}$) at the output of the amplifier 240, if the signal at the inverting input of the amplifier is 20 $pC_{p-p}$ (uncompensated), then $C_{FB}$ must be equal to 20 pF. In contrast if the maximum amplitude of the signal at the inverting input of the amplifier 240 is 2 $pC_{p-p}$ (compensated), then $C_{FB}$ must only equal to 2 pF to provide a dynamic range of 1 $V_{p-p}$. This reduction in size of $C_{FB}$ is a significant advantage in terms of chip cost and "real estate" for the ASIC 305 (FIG. 8), which, in one embodiment, can contain multiple capacitive sensing circuits 500 at its input stage. Capacitors require a relatively large die area in integrated circuits, which add to their costs and limit the number of devices (e.g., transistors) that can be integrated onto the IC chip. Therefore, it is advantageous to decrease the size of capacitors in IC chips when possible.

As shown in FIG. 11, the output waveform 511 of the amplifier 240 is provided to a first input of a mixer 514. Since the waveform 511 is a square wave, which may create undesirable harmonics, a demodulation waveform 516, which may be a sine wave digitally generated from the look-up table 510, is synchronized to the output signal 511 and provided to a second input of the mixer 514. In one embodiment, the mixer 514 demodulates the output 511 of the charge amplifier by subtracting the demodulation waveform 516 from the output signal 511 to provide better noise rejection. The mixer 514 rejects all frequencies outside its passband, which may be about ±30 kHz around the frequency of the demodulation waveform 516. This noise rejection may be beneficial in noisy environment with many sources of noise, such as 802.11, Bluetooth, etc. In some embodiments, the mixer 514 may be implemented as a synchronous rectifier that outputs a rectified Gaussian sine wave. The output of the mixer is provided to an analog-to-digital converter (ADC) 518, which converts the analog signals into corresponding digital signals for storage and processing by the microprocessor 307 (FIG. 8).

In one embodiment, the ADC 518 may be a sigma-delta converter, which may sum a number of consecutive digital values and average them to generate a result. However, other types of ADCs (such as a voltage to frequency converter with a subsequent counter stage) could be used. The ADC typically performs two functions: (1) it converts the offset compensated waveform out of the mixer 514 to a digital value; and (2) it performs low pass filtering functions, e.g., it averages a rectified signal coming out of the mixer arrangement. The offset compensated, demodulated signal looks like a rectified Gaussian shaped sine wave, whose amplitude is a function of $C_{FB}$ and $C_{SIG}$. The ADC result returned to the microprocessor 307 is typically the average of that signal.

It is appreciated that the front-end charge compensation provided by the summing circuit 502 also significantly improves utilization of the dynamic range of the amplifier 240. Referring again to FIG. 10B, the uncompensated charge waveforms generated by a capacitive sensing node 83 (FIG. 3) may be in range of 18 $pC_{p-p}$ (max touch) to 20 $pC_{p-p}$ (no touch). If these signals were provided directly to the inverting input of the amplifier 240, and if the feedback capacitor ($C_{FB}$) is equal to 10 pF, for example, the output of the amplifier will be a voltage waveform in the range of 1.8 $V_{p-p}$ (max touch) to 2.0 $V_{p-p}$ (no touch). Thus, the dynamic range utilized to sense the difference between a no touch condition and max touch condition would be only 0.2 $V_{p-p}$, which represents a poor utilization of the dynamic range of the amplifier 240.

Figure 12:
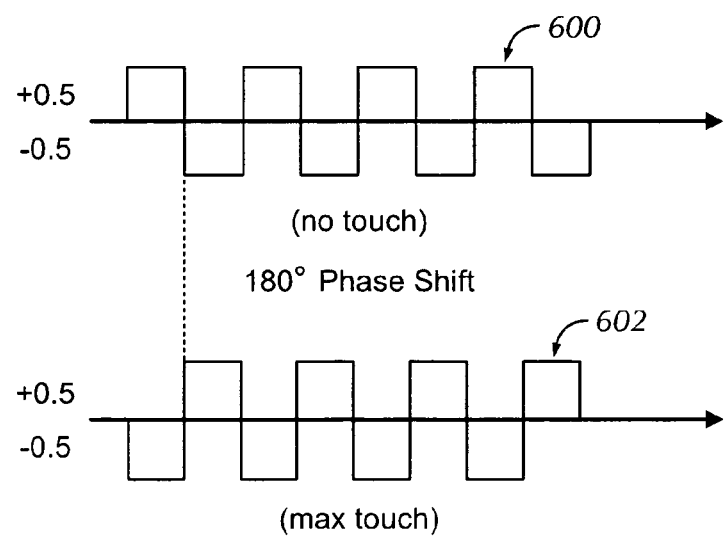
FIG. 12 illustrates exemplary compensated signal waveforms representing a "no touch" and "max touch" state, respectively, in accordance with one embodiment of the present invention.

FIG. 12 illustrates a compensated charge square waveform 600 when the output charge square waveform 404 (FIG. 10B) having an amplitude of 20 $pC_{p-p}$, which represents a "no touch" state, is compensated with a compensation waveform 506 (FIG. 11) having an amplitude of 19 $pC_{p-p}$ at the same frequency but 180 degrees out of phase with the output waveform 404. The resulting compensated waveform 600 is a charge waveform having an amplitude of 1 $pC_{p-p}$ with a phase that is the same as the original output waveform 404. FIG. 12 further illustrates a compensated charge square waveform 602 when the output charge square waveform 406 having an amplitude of 18 $pC_{p-p}$, which represents a "max touch" state, is compensated with the compensation waveform 506. The resulting compensated waveform 602 is a charge waveform having an amplitude of 1 $pC_{p-p}$ with a phase that is the same as the compensation waveform 506 and opposite the phase of the waveform 600.

Thus, with front-end charge compensation, the charge waveform provided to the inverting input of the amplifier 240 swings from +0.5 pC to −0.5 pC and its phase shifts 180 degrees as the output levels transition from a "no touch" state to a "max touch" state. If the feedback capacitor ($C_{FB}$) 242 is equal to 1 pF, for example, the output of the amplifier 240 will mirror the inverting input and will swing from +0.5 V to −0.5 V from a "no touch" state to a "max touch" state. Thus, in this example, the utilizing of the dynamic range of the amplifier 240 is increased from 0.2 $V_{p-p}$ to 1.0 $V_{p-p}$, which is a significant improvement. Additionally, the phase of the amplifier output will shift by 180 degrees at approximately a midpoint (e.g., a "medium touch" state) during the transition from a "no touch" state to a "max touch" state. This phase shift can be utilized to provide additional information concerning the level of pressure being exerted by a touch or a type of touch.

As mentioned above, as a finger is pressed more firmly onto a touch surface, it tends to flatten and increase in surface area, thereby stealing more charge from the sensing node and reducing $C_{SIG}$. Thus, the compensated waveform 600 will decrease in peak-to-peak amplitude from a "no touch" state to a "medium touch" state, at which point the compensated waveform 600 is ideally a flat line having an amplitude of 0 $V_{p-p}$. As a finger is pressed harder onto the touch surface, the compensated waveform will transition from a "medium touch" state to a "max touch" state and shift 180 degrees in phase. Additionally, its amplitude will gradually increase as the finger is pressed down harder until the compensated waveform reaches the "max touch" state waveform 602, as shown in FIG. 12.

Figure 13A:
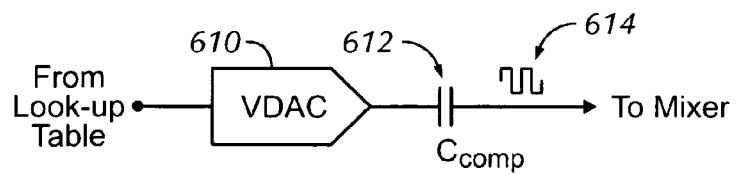
FIG. 13A illustrates an exemplary compensation signal generator circuit, in accordance with one embodiment of the present invention.

FIG. 13A illustrates an exemplary compensation signal generator 504 (FIG. 11) that includes a digital-to-analog voltage converter (VDAC) 610 and compensation capacitor ($C_{COMP}$) 612, in accordance with one embodiment of the invention. The VDAC 610 receives digital signals from a look-up table (e.g., look-up table 510 in FIG. 11) and generates a corresponding analog voltage signal (e.g., a square wave) having a desired amplitude, frequency and phase. This analog voltage signal is then provided to $C_{COMP}$ 612, which converts the voltage waveform into a charge waveform 614 for compensating a charge waveform (e.g., 404 or 406) outputted by a touch surface device, for example. This exemplary compensation circuit provides the benefit of increasing the dynamic range of the analog sensing circuit, which includes the amplifier 240 and feedback capacitor ($C_{FB}$) 242 discussed above. However, one potential drawback to this compensation circuit is the necessity of the compensation capacitor ($C_{COMP}$) 612. This capacitor will typically be approximately the same size or on the same order of magnitude in size as $C_{FB}$. Therefore, the cost and chip "real estate" savings achieved by the reduction in size of $C_{FB}$ 242 is offset to some extent by the need for $C_{COMP}$ 612.

Figure 13B:
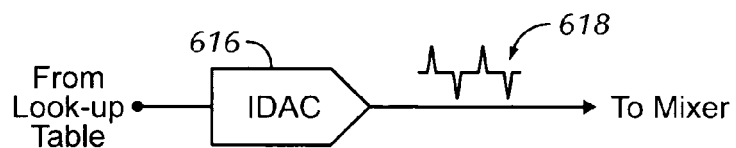
FIG. 13B illustrates another exemplary compensation signal generator circuit, in accordance with another embodiment of the present invention.

FIG. 13B illustrates another exemplary compensation signal generator 504 comprising a digital-to-analog current converter (IDAC) 616, in accordance with another embodiment of the invention. In this embodiment, IDAC 616 generates a periodic current waveform 618 having a desired amplitude, frequency and phase based on digital codes received from the look-up table 510 (FIG. 11). Since current represents a change in charge over time (or, in other words, charge is the integral of current over time), the current waveform 618 resembles a square wave when viewed in the charge domain. Thus, the current waveform 618 can be provided directly to the input of the summing circuit 502 (FIG. 11) to compensate the output charge waveform 404 or 406 from the touch surface device. However, because the current waveform 618 is characterized by a plurality of periodically alternating current spikes, it presents potentially difficult timing issues when trying to achieve an accurate 180 degree phase shift between the current waveform 618 and the output charge waveform 404 or 406 from the touch surface device. Thus, the IDAC 616 provides both the benefits of increasing the dynamic range of the analog sensing circuit 500 (FIG. 11) and decreasing IC chip cost and "real estate" requirements due to $C_{FB}$ (since $C_{COMP}$ is not required). However, the IDAC 616 is less tolerant of phase mismatches and potentially adds to the complexity of the timing logic requirements of the sensing circuit 500.

Figure 14:
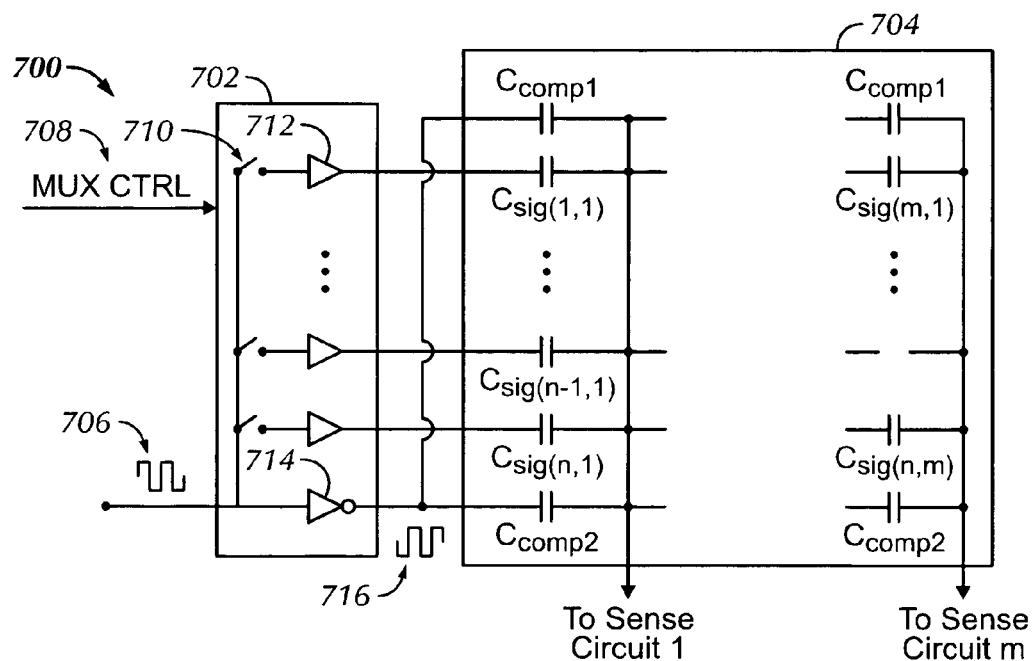
FIG. 14 is a diagram of a touch surface device and its drive circuitry, wherein portions of the touch surface device are utilized to generate a compensation signal, in accordance with one embodiment of the present invention.

FIG. 14 illustrates a diagram of a touch surface system 700 that includes a high-voltage level shifter and decoder unit 702 and touch surface panel 704, in accordance with one embodiment of the invention. In this embodiment, the touch surface panel 704 utilizes two touch-insensitive portions (e.g., top and bottom rows) of the touch surface panel 704 to provide substantially fixed mutual capacitance values $C_{COMP1}$ and $C_{COMP2}$, respectively. When a 180-degree phase-shifted drive signal is applied to the top and bottom rows, $C_{COMP1}$ and $C_{COMP2}$ generate two compensation signals that, when summed, compensate the output signals provided by the capacitive nodes of a selected touch-sensitive row, as described above. The level shifter/decoder unit 702 performs functions similar to the level shifter 310 and decoder 311 described above with respect to FIG. 8. In this embodiment, however, the functionality of these devices is integrated into a single IC chip 702. The level shifter/decoder unit 702 receives an input waveform 706 from ASIC 305 (FIG. 8), which may be a series of twelve square wave pulses having a peak-to-peak amplitude of 2 $V_{p-p}$, for example. The level shifter/decoder unit 702 then amplifies this signal to 20 $V_{p-p}$, for example, and provides this drive signal to a selected row (1-*n*) based on a timing signal or MUX control signal 708 received from a microprocessor 307 (FIG. 8) or the ASIC 305.

The level shifter/decoder unit 702 further includes a plurality of selection switches 710, which close when a corresponding row has been selected to be driven by the drive signal. In one embodiment, the level shifter/decoder unit 702 has an output driver 712 corresponding to each row of the panel 704. In alternative embodiments multiple rows may be connected to the output of one or more drivers 712 via a multiplexing/demultiplexing circuit arrangement. The level shifter/decoder unit 702 further includes an inverting gate 714 which inverts the incoming drive signal 706 to produce a 180-degree phase-shifted compensation signal that is provided to a top compensation row ($C_{COMP1}$) and a bottom compensation row ($C_{COMP2}$) of the touch surface panel 704.

The touch surface panel 704 includes a plurality of capacitive sensing nodes, $C_{SIG(n, m)}$, arranged in an (n×m) matrix, where n represents the number of touch sensitive row electrodes and m represents the number of column electrodes, which through mutual capacitance, provide output signals indicative of touch or no-touch conditions on the panel 704. The panel 704 further includes a top row or strip that is touch-insensitive and provides a substantially fixed capacitance of $C_{COMP1}$. A bottom strip of the panel is also touch-insensitive and provides a substantially fixed capacitance of $C_{COMP2}$. As discussed above, the drive signal applied to the top and bottom touch-insensitive rows is 180 degrees out of phase with the drive signal applied to a selected touch-sensitive row. Each column electrode is always connected to the touch-insensitive rows and selectively connected to a touch-sensitive row (1-*n*) one at a time. Thus, the compensated capacitance seen at the output of each column electrode is effectively $C_{SIG}-(C_{COMP1}+C_{COMP2})$.

In one embodiment, the top and bottom strips of the panel 704 are designed so that the values of $C_{COMP1}$ and $C_{COMP2}$ satisfy the following equation:

$$C_{COMP1}+C_{COMP2}=(2C_{SIG}-\Delta C_{SIG})/2.$$

In the above equation, $\Delta C_{SIG}$ represents the change in mutual capacitance due to a max touch condition, as discussed above. With this design, the effective compensation signal provided by $C_{COMP1}$ and $C_{COMP2}$ has an amplitude that is equal to the average of the amplitude of the capacitive sensing node outputs when the node is experiencing a "no touch" state ($C_{SIG}$) and a "max touch" state ($C_{SIG}-\Delta C_{SIG}$). Some of the advantages of designing the amplitude of the compensation signal to be equal to the average of the output values corresponding to a "no touch" state and a "max touch" state are discussed above with respect to FIG. 12.

Figure 15:
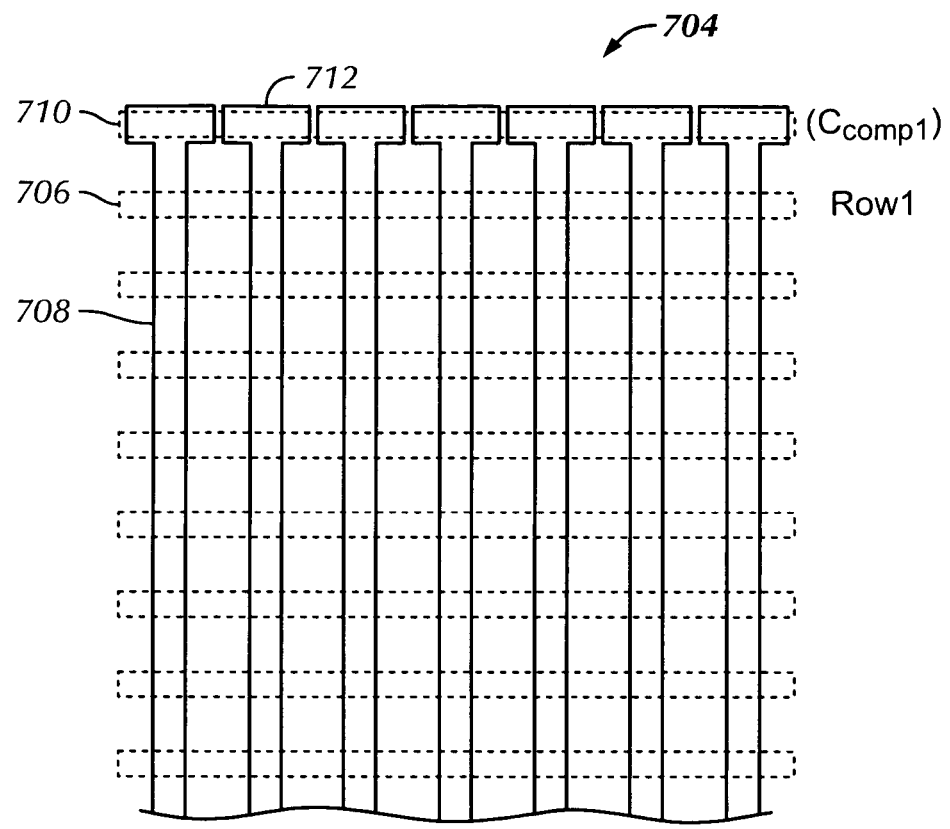
FIG. 15 is a perspective top view of an exemplary touch surface panel wherein a top row of the touch surface panel is utilized to generate a compensation signal, in accordance with one embodiment of the invention.

FIG. 15 illustrates a perspective view of a top portion of the touch surface panel 704, in accordance with one embodiment of the invention. The panel 704 includes a plurality of row electrodes 706 separated by a dielectric layer (not shown) from a plurality of column electrodes 708. In this embodiment, the column electrodes 708 are formed on top of the row electrodes 706 and are substantially orthogonal to the row electrodes. However, other configurations and arrangements would be readily apparent to those of skill in the art. As discussed above, a capacitive sensing node or "pixel" is formed at the intersection of each row electrode 706 and each column electrode 708. A mutual capacitance is formed at each node when a drive signal is applied to a corresponding row electrode (i.e., drive electrode). In this embodiment, the row electrodes 706 are configured as the drive electrodes and the column electrodes 708 are configured as sense electrodes. In alternative embodiments, the row electrodes 706 may be configured as the sense electrodes and the column electrodes 708 may be configured as the drive electrodes which are driven by a drive input signal applied to the panel 704.

The top row 710, however, is touch-insensitive due to the configuration and arrangement of the top portions 712 of the column electrodes 708 above the top row 710. As shown in FIG. 15, the top portions 712 of the column electrodes 708 are expanded to substantially cover the entirety of the top row 710, thereby shielding the mutual capacitance ($C_{COMP1}$) formed between the top row 710 and respective top portions 712 of the column electrodes 708 from any shunting effects that would otherwise be caused by a finger or other object touching the top portion of the panel 704. Although the top portions 712 are expanded, they do not make electrical contact with adjacent top portions 712. A bottom touch-insensitive row (not shown) is formed in a similar fashion. It is understood that in alternative embodiments there may only be one touch-insensitive row, or any number of desired touch-insensitive rows or columns. For example, the insensitive portions of the panel 704 may be configured along one or both side edges of the panel 704 instead of the top and bottom edges. In such a configuration, the row electrodes 706 can be formed on top of the column electrodes 708 with the ends of the row electrodes 706 expanded in a similar manner as the expanded portions 712 of the column electrodes 708.

Figure 16A:
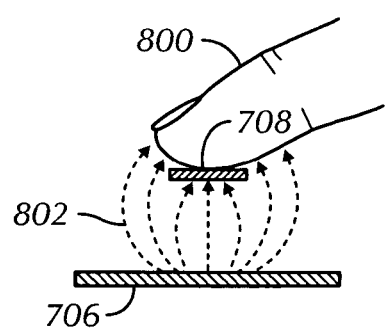
FIGS. 16A and 16B are perspective views of a touch-sensitive capacitive sensing node and a touch-insensitive node that is utilized to generate at least a portion of a compensation signal, in accordance one embodiment of the invention.
Figure 16B:
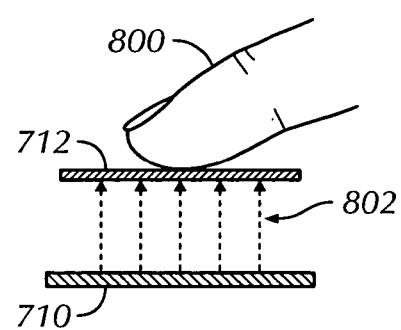

FIGS. 16A and 16B illustrate the effects of a finger touching a touch-sensitive and a touch-insensitive portion of the panel 704, respectively. Referring to FIG. 16A, when a finger 800 or other object touches or comes in sufficient proximity to (collectively referred to as a "touch" herein) a sensing node formed at an intersection of a column electrode 708 and a row electrode 706, the finger or object blocks or "steals" some of the electric field lines 802 between the column 708 and row 706. These electric field lines are shunted to ground through the capacitance inherent in the finger, and as a result, the steady state signal capacitance $C_{SIG}$ is reduced by $\Delta C_{SIG}$. Therefore, the signal capacitance at the node becomes $C_{SIG}-\Delta C_{SIG}$, where $C_{SIG}$ represents the static (no touch) component and $\Delta C_{SIG}$ represents the dynamic (touch) component.

FIG. 16B illustrates the shielding effects of the expanded portions 712 of the column electrodes 708 when a finger touches the corresponding top or bottom portion of the panel 704. Since the expanded portions 712 of the column electrodes substantially cover the entirety of the underlying row electrode 710, the finger 800 is shielded from the underlying electrodes and does not affect the electric field lines 802 between the electrodes. Thus, there is no shunting effect or sensitivity to a touch event at this portion of the panel 704. As discussed above, the touch-insensitive top and bottom rows or portions of the panel 704 may be designed to provide desired values of $C_{COMP1}$ and $C_{COMP2}$, respectively. Those of skill in the art would readily know how to achieve such desired mutual capacitance values in order to generate a desired compensation signal as described herein.

One advantage of generating the compensation signal through the panel 704, as described above, is that the compensation signal will substantially "track" any variations in the mutual capacitance ($C_{SIG}$) values present at the touch-sensitive portions of the panel 704 that may be due to, for example, variations in operating parameters (e.g., temperature) and/or processing parameters (e.g., dielectric thickness). Thus, the compensation signal will mimic any variations in the output signals from the touch-sensitive portions of the panel 704. One disadvantage, however, is that the effective surface area of the panel 704 for receiving touch inputs is slightly reduced.

Figure 17:
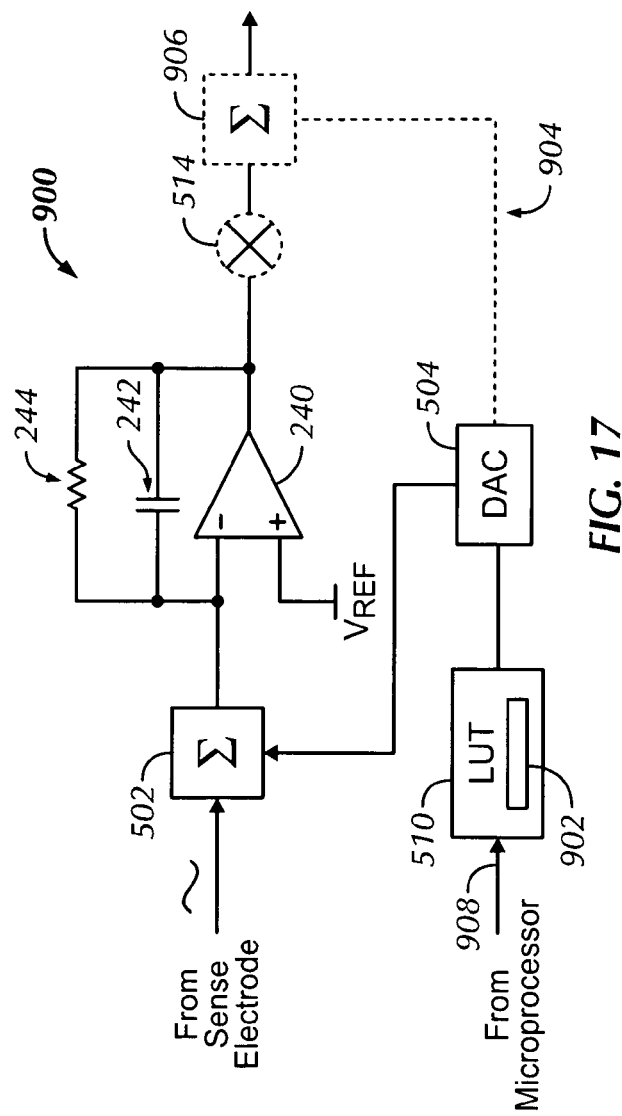
FIG. 17 is a diagram of an analog sensing circuit and compensation circuit, in accordance with various embodiments of the invention.

It has been found that $C_{SIG}$ will vary across a touch surface panel because of the geometrical and physical properties of the panel and a variety of other manufacturing tolerance related factors. Therefore, it may be useful to adjust the compensation signal waveform, amplitude, frequency and/or phase to match the variance of $C_{SIG}$ on a per-pixel and/or a per-row basis and/or per-column basis. This allows signal compensation to be performed to optimize the performance of each pixel, row or column. FIG. 17 illustrates a diagram of a compensation circuit for adjusting one or more aspects (e.g., waveform, amplitude, frequency, phase, etc.) of a compensation signal depending on the current pixel (a.k.a., sense node) being sensed. In one embodiment, adjustment of the compensation signal is performed by programming a look-up table 510 such that it provides a different digital code to a register 902 located in the look-up table 510, depending on which row, column and/or pixel is currently being sensed. The DAC 504 then generates an analog compensation signal having an amplitude, frequency and waveform and/or phase corresponding to the unique digital value stored in register 902. Again, the adjustment could be performed on a true pixel by pixel basis, on a row-by-row basis, a column-by-column basis, or any desired combination of these parameters depending on a particular implementation. Also, although discussed in terms of rows and columns, the compensation signal adjustment is equally applicable to non-Cartesian coordinate systems, in accordance with various embodiments of the present invention.

As an alternative to the arrangement described above, an adjusted compensation signal may be provided after the amplifier 240 stage, in accordance with another embodiment of the invention. As illustrated by the optional dashed signal line 904 in FIG. 17, in this alternative embodiment, the adjusted compensation signal is provided to an optional summing circuit 906 having an input coupled to the output of the amplifier 240. In this case, the shape of the offset compensation waveform is designed to match the waveform coming out of the amplifier 240 rather than the waveform coming out of the panel 704 (FIG. 14). If offset compensation is performed on the output signal from the amplifier 240, the compensation signal will typically be an alternating current (AC) waveform (e.g., square wave or sinusoidal) in order to match the waveform coming out of the amplifier 240. The peak-to-peak amplitude of the offset waveform is equivalent to the amount of offset compensation desired and may vary on a pixel-by-pixel, row-by-row and/or column-by-column basis.

Alternatively, the compensation signal may be provided to the output signal after it has been demodulated by an optional mixer 514, as discussed above with respect to FIG. 14. In this case, the offset waveform will typically be a direct current (DC) waveform since the demodulated waveform is also typically a DC waveform. Again, the amplitude in this case is equivalent to the amount of offset compensation desired for every part of the demodulated waveform and may vary depending on the location of the current pixel being sensed on the panel 704. Thus, the offset compensation circuit needs to correlate the amount of offset compensation needed depending on the shape of the waveform, taking into account where in the output circuitry offset compensation is taking place and the location of the current pixel being sensed.

The above parameters (e.g., pixel location, compensation circuit location, output signal waveform, etc.) may be taken into account during programming of the look-up table 510. Programming of the LUT 510 may be performed at any desired or appropriate time (e.g., during manufacture or factory set up). Referring again to FIG. 17, the look-up table 510 receives a timing or control signal 908 from the microprocessor 307 (FIG. 8) in order to determine which row (and/or column) is currently being driven by a drive signal and, hence, being sensed by sensing circuit 900. Based on this control signal 908, the look-up table 510 provides a corresponding digital value to register 902, which is then provided to the DAC 504 to generate a corresponding analog compensation signal taking into account some or all of the above-described factors. The shape, amplitude, and frequency of the compensation signal waveform is determined by programming suitable coefficients into lookup table 404.

Another aspect of adjusting the compensation signal so as to minimize the effects of mismatches between the compensation signal and the output signal to be compensated, relates to phase delay adjustment. As is known in the art, the touch surface electrodes can be represented by a plurality of RC networks that have a mutual capacitance ($C_{SIG}$) at the point they intersect. Each RC network constitutes a low pass filter, while $C_{SIG}$ introduces a high pass filter response. Therefore the touch panel looks like a bandpass filter, only allowing signals within certain frequency ranges to pass the panel. This frequency range, i.e., those frequencies that are below the cutoff of $C_{SIG}$ but above the cutoff of the RC Networks, determines the stimulus frequencies that may be used to drive the touch panel.

The panel will therefore impose a phase delay on the stimulus waveform passing through it. This phase delay is negligible for traditional opaque touch panels, wherein the electrode structure is typically formed by PCB traces, which have negligible resistance to their characteristic impedance. However, for transparent panels, typically constructed using Indium Tin Oxide (ITO) conductive traces, the resistive component may be quite large and varies depending on pixel location within the panel 704 and the physical geometries of the ITO traces which connect the pixels to the sensing circuitry 900. For higher resistance values, a significant time (phase) delay in the propagation of the stimulus voltage through the panel may occur. This phase delay causes the output signals from the panel 704 to be delayed before entering the amplifier 240. For example, in FIG. 14, the pixel corresponding to $C_{SIG(m, 1)}$ may exhibit the highest resistance due to the length of ITO traces that must be traversed by a signal before it is sensed by a sensing circuit.

To compensate for this phase delay, a delay value may be provided to the register 902 depending on the current row being driven, for example. This delay value can be used to delay the compensation waveform relative to the signal entering the amplifier 240 therefore compensating for the external panel delay. In one embodiment, the delay value simply delays the compensation waveform by a predetermined amount. The amount may be determined either on startup of the panel by measurement, or may be estimated for the panel as a whole based on known manufacturing characteristics. Each pixel of the touch surface may have its own uniquely determined delay parameter to fully optimize the sensing circuitry, or the delay parameter may be determined on a row by row basis. In one embodiment, a output sensing circuit 900 is coupled to each column (i.e., sense) electrode. Thus, a column value corresponding to each column electrode can be programmed for each respective look-up table 510. Since this column value remains fixed for each look-up table 510, only the current row value is needed to determine a current pixel being sensed and a corresponding delay value. In various embodiments, the register 902 may be implemented as a single register or multiple registers for storing values related to each of the parameters discussed above. Additionally, the register 902 may be located either in the look-up table 510 or in the DAC 504, or any other desired location in a circuit or ASIC.

As discussed above with reference to FIG. 14, in one embodiment, the compensation signal is generated by two touch-insensitive rows which provide compensation mutual capacitance values $C_{COMP1}$ and $C_{COMP2}$, respectively. In this embodiment, the compensation signal provided by $C_{COMP1}$ and $C_{COMP2}$, track variations in $C_{SIG}$ due to manufacturing and operational parameter variations. Therefore, many of the adjustments to the compensation signal discussed above are not necessary in this embodiment. In this embodiment, however, phase variations may occur between the compensation signal $Q_{COMP}$ and the output sense signal $Q_{SIG}$ due to timing errors in drive signal generation and/or ITO trace length propagation differences between $Q_{COMP}$ and $Q_{SIG}$, which results in resistance variation and, hence, propagation delay variance through the panel 704. In the exemplary embodiment of FIG. 14, propagation delays for $Q_{COMP}$ will vary less than the propagation delays for $Q_{SIG}$ because propagation delays in $Q_{COMP}$ will vary only as a function of column position whereas propagation delays for $Q_{SIG}$ vary as a function of both column and row position. However, variations due to column position are "matched" between $Q_{COMP}$ and $Q_{SIG}$ so they tend to cancel each other out. Additionally, the variations in delay due to row position tend to cancel because the top compensation path is slower than the $Q_{SIG}$ signal path, while the bottom compensation path is faster so on average the net compensation propagation delay (average of top and bottom) behaves as if it was positioned in the center row.

Figure 18:
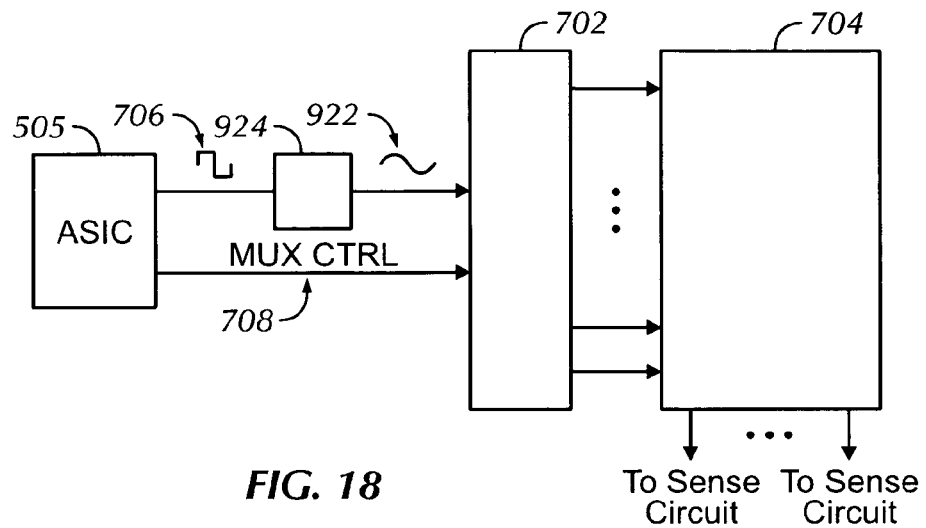
FIG. 18 is a block diagram of a touch surface drive circuit, in accordance with one embodiment of the invention.

In order to reduce the effects of this phase mismatch between $Q_{COMP}$ and $Q_{SIG}$, in one embodiment, the drive signal applied to the touch surface panel is a sinusoidal waveform. FIG. 18 illustrates a diagram of drive circuitry 920, in accordance with one embodiment of the invention. The drive circuitry 920 includes the ASIC 305 (FIG. 8), which generates a square wave drive signal 706 (FIG. 14). As is known in the art, generating such a square wave may be accomplished by toggling a switch between two reference voltage levels and, therefore, is a relatively simple, inexpensive way to generate an AC drive signal. The square wave drive signal 706 is converted into a sinusoidal waveform 922 by a conversion circuit 924. In one embodiment, the conversation circuit 924 my be a slew rate limiting circuit which decreases the rise and fall times of the edges of the square wave 706 so that it resembles a sinusoidal waveform. Such slew rate limiters are well-known in the art. In an alternative embodiment, the conversion circuit 924 is implemented as a low-pass filter, which removes higher-order harmonics of the square wave 922 so to generate the sinusoidal waveform 922. Such low-pass filters are also well-known in the art. The sinusoidal waveform 922 is then provided to the level shifter/demultiplexer 702, which amplifies the waveform 922 to a desired amplitude (e.g., 18-20 $V_{p-p}$) and applies the amplified signal 924 to a selected row (i.e., drive) electrode of the panel 704. As described above, the level shifter/demultiplexer 702 also inverts the amplified signal 924 to provide an inverted sinusoidal drive signal 926 to the compensation rows, $C_{COMP1}$ and $C_{COMP2}$, of the panel 704. The resulting output and compensation signals generated by the mutual capacitance values $C_{SIG}$, $C_{COMP1}$ and $C_{COMP2}$, are described in further detail below with respect to FIGS. 21A and 21B.

Figure 19:
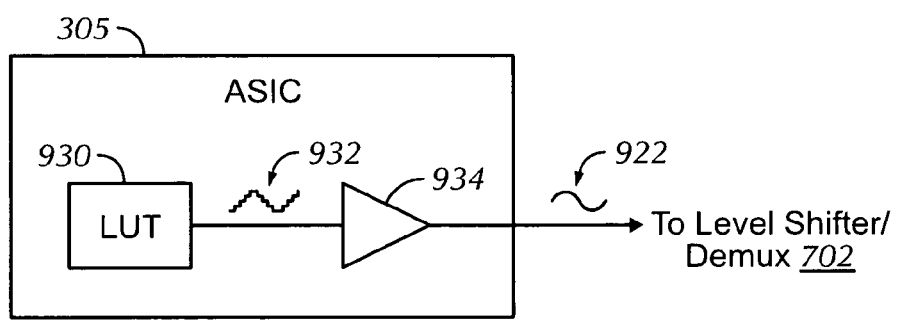
FIG. 19 is a diagram of an ASIC that generates a digitally-synthesized sinusoidal waveform, in accordance with one embodiment of the invention.

FIG. 19 illustrates a diagram of the ASIC 305 configured to generate a sinusoidal drive signal, in accordance with another embodiment of the invention. The ASIC 305 includes a look-up table 930 that generates a digitally synthesized sinusoidal waveform 932, which is provided to a buffer 934 for smoothing the waveform 932 into the sinusoidal waveform 922. The sinusoidal waveform 922 is then provided to the level shifter/demultiplexer 702, which amplifies and inverts the signal 922, as described above.

Figure 20A:
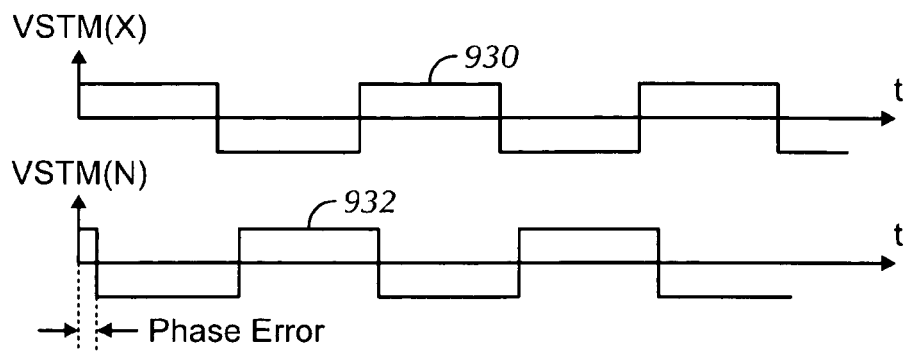
FIGS. 20A and 20B illustrates the effects of phase mismatch between a square wave output signal and a square wave compensation signal.
Figure 20B:
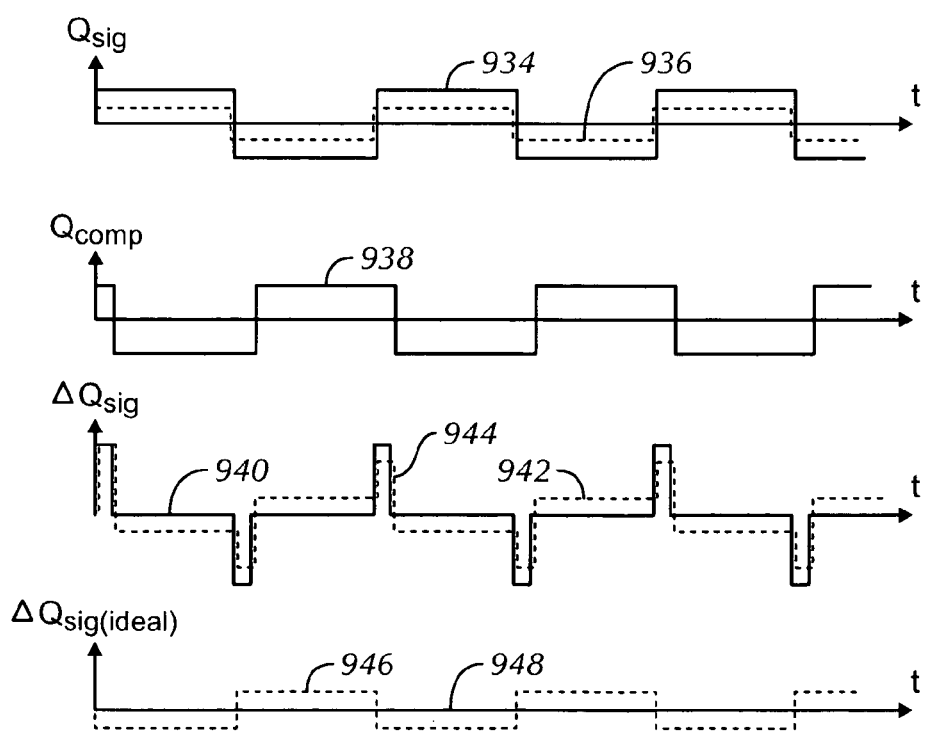

FIGS. 20A and 20B illustrate the effects of phase mismatch between the compensation signal $Q_{COMP}$ and the output signal $Q_{SIG}$. FIG. 20A shows a phase mismatch between a drive signal 930 (designated as VSTM(x)) and an inverted drive signal 932 (designated as VSTM(n)) due to timing errors and/or propagation delays in generating these signals in the level shifter/demultiplexer 702. FIG. 20B illustrates the output charge waveforms generated at a capacitive sense node or pixel when there is a no-touch condition 934 and a touch condition 936. A compensation charge waveform 938 designated as $Q_{COMP}$, which is generated by the inverted drive or stimulation signal VSTM(n), has a similar phase mismatch with the output charge waveforms 934 and 936. In this example, the compensation waveform has an amplitude substantially equal to the amplitude of the output signal 934 in a no-touch state. The mismatch in phase results in corresponding compensated waveforms 940 (no-touch) and 942 (touch) designated as $\Delta Q_{SIG}$, each having spikes 944 due to the phase mismatch which have an amplitude that is double the amplitude of the original waveforms 934 and 936. The phase mismatch spikes 944 when applied to the amplifier 240 can cause the amplifier 240 to saturate for short periods of time. This causes loss of charge and definition of input signals, which causes errors and incorrect readings. When compared to the ideally compensated output waveforms 946 (no-touch) and 948 (touch) designated as $\Delta Q_{SIG(ideal)}$, one can see that the phase mismatch makes a significant difference in the resulting compensated signals.

Figure 21A:
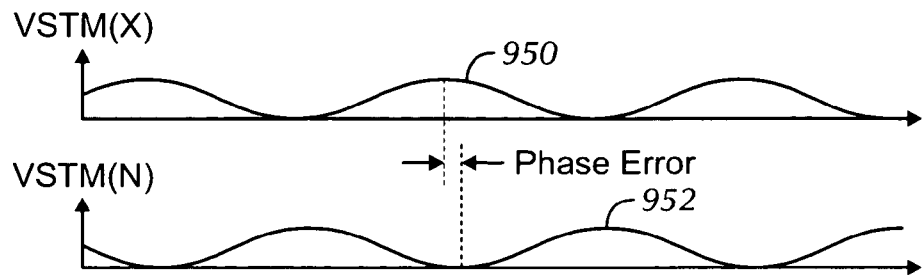
FIGS. 21A and 21B illustrates the effects of phase mismatch between a sinusoidal output signal and a sinusoidal compensation signal, in accordance with one embodiment of the invention.
Figure 21B:
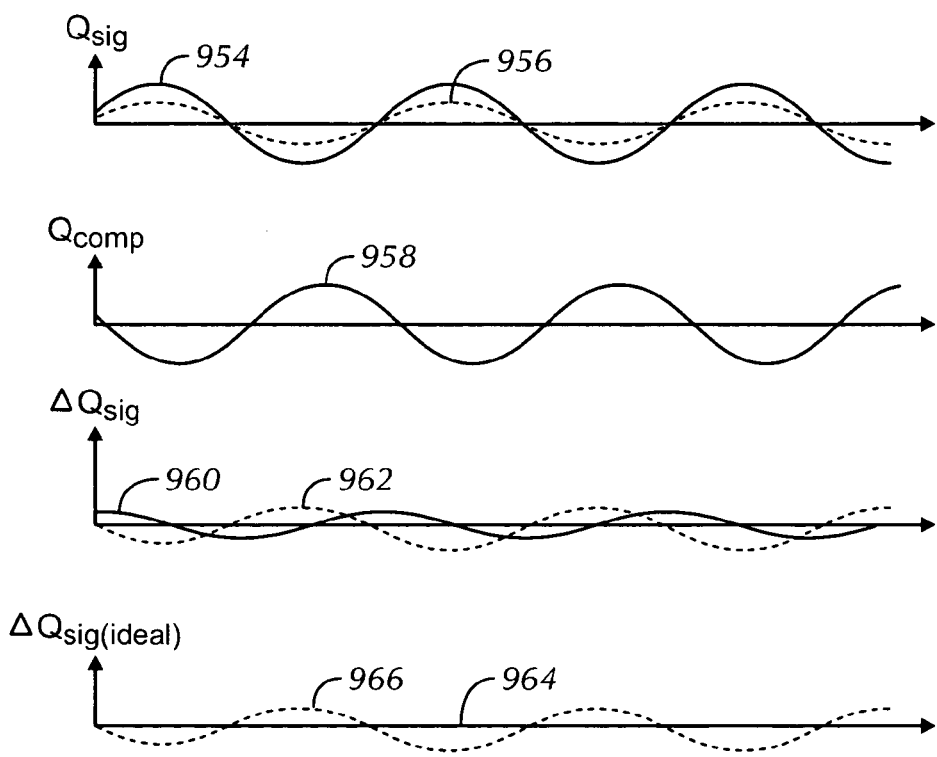

FIG. 21A illustrates sinusoidal drive signals VSTM(x) 950 and VSTM(n) 952 having a phase mismatch between them. FIG. 21B illustrates the resulting output charge waveforms $Q_{SIG}$ 954 (no-touch) and $Q_{SIG}$ 956 (touch) and the compensation waveform $Q_{COMP}$ 958 having a corresponding phase mismatch. The resulting compensated output waveforms 960 (no-touch) and 962 (touch) are not significantly different from their ideal counterparts 964 (no-touch) and 966 (touch) and, significantly, do not have high-amplitude spikes that can saturate the amplifier 240, as is the case with square wave waveforms discussed above with respect to FIGS. 20A and 20B. As shown in FIG. 20B, phase mismatches between two sinusoidal signals that are summed together have relatively little impact on the resulting summed signal.

Thus, by driving or stimulating the drive electrodes of the touch surface panel with sinusoidal waveforms instead of square waveforms the effects of any phase mismatches between the compensation signal waveform and the sense node output waveform are minimized. Although sinusoidal drive signals have been described in the context of the embodiment of FIG. 14, which performs on-panel compensation signal generation, it is should be understood that sinusoidal waveforms would have similar benefits when the compensation signal is generated by a separate look-up table and DAC in accordance with the embodiments described and illustrated in FIG. 11, for example. In these embodiments, a sinusoidal drive signal is generated by the ASIC 305 as described above. However, the sinusoidal compensation signal is generated off-panel by the look-up table 510 and DAC 504, as described above. In various embodiments, the sinusoidal waveforms may supplement or replace the per-pixel adjustment of the compensation signal discussed above. In applications, where high sensitivity and precision are desired, amplitude, frequency and phase mismatches are minimized by a programmable look-up table 510 (FIG. 17), as described above. Any remaining phase mismatches can further be minimized by utilizing sinusoidal waveforms instead of square wave drive and compensation signals.

While various embodiments of the present invention have been described above, it should be understood that they have been presented by way of example only, and not of limitation. For example, although the disclosure is primarily directed at devices that utilize capacitive sensing, some or all of the features described herein may be applied to other sensing methodologies. Additionally, although embodiments of this invention are primarily described herein for use with touch sensor panels, proximity sensor panels, which sense "hover" events or conditions, may also be used to generate modulated output signals for detection by the analog channels. Proximity sensor panels are described in Applicants' co-pending U.S. application Ser. No. 11/649,998 entitled "Proximity and Multi-Touch Sensor Detection and Demodulation," filed concurrently herewith, the contents of which are incorporated herein by reference in its entirety. As used herein, "touch" events or conditions should be construed to encompass "hover" events and conditions. Likewise, the various diagrams may depict an example architectural or other configuration for the invention, which is done to aid in understanding the features and functionality that can be included in the invention. The invention is not restricted to the illustrated example architectures or configurations, but can be implemented using a variety of alternative architectures and configurations. Additionally, although the invention is described above in terms of various exemplary embodiments and implementations, it should be understood that the various features and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. A touch surface device, comprising:
a compensation circuit configured for receiving an output signal from a sense node on a touch-sensitive panel, generating a compensation signal, adjusting at least one parameter of the compensation signal based on a location of the sense node on the panel, and combining the compensation signal with the output signal to produce a compensated output signal; and
a demodulator coupled for receiving and demodulating the compensated output signal.

2. The touch surface device of claim 1 wherein the at least one parameter comprises at least one of: amplitude, frequency, type of waveform and phase.

3. The touch surface device of claim 1 further comprising an amplifier having an inverting input coupled for receiving the compensated output signal and a non-inverting input coupled to a known reference voltage.

4. The touch surface device of claim 3, wherein the compensation circuit comprises:
a summing circuit having first and second inputs and an output, wherein the output signal from the sense node is received at the first input and the output of the summing circuit is coupled to the inverting input of the amplifier;
a digital-to-analog converter (DAC) for generating the compensation signal, the DAC having an output coupled to the second input of the summing circuit; and
a look-up table, coupled to an input of the DAC, for storing and providing a digital code to the DAC, wherein the digital code reflects the location of the sense node on the panel and the compensation signal is generated based on the digital code.

5. The touch surface device of claim 4 wherein the output signal comprises a sinusoidal waveform and the DAC generates a sinusoidal compensation signal.

6. The touch surface device of claim 1, wherein the combining of the compensation signal with the output signal comprises combining the compensation signal with an unmodified output signal from the touch-sensitive panel.

7. A touch surface device, comprising:
a touch-sensitive panel having a sense node for providing an output signal indicative of a touch or no-touch condition on the panel;
a drive circuit for generating a sinusoidal drive signal provided to the sense node of the touch-sensitive panel;
at least one non-touch-sensitive node within the touch-sensitive panel, for generating a sinusoidal compensation signal, wherein the sinusoidal compensation signal is summed with the output signal to provide a sinusoidal compensated output signal; and a sensing circuit for receiving the sinusoidal compensated output signal.

8. The touch surface device of claim 7 further comprising:
an inverter for inverting the sinusoidal drive signal to generate an inverted sinusoidal drive signal, wherein the inverted sinusoidal drive signal is applied to the at least one non-touch-sensitive node, thereby generating the compensation signal at the at least one non-touch-sensitive node; and
a sense electrode, coupled to the sense node and the at least one non-touch-sensitive node, for providing the sinusoidal compensated output signal to the sensing circuit.

9. The touch surface device of claim 7 wherein the sensing circuit comprises an amplifier having an inverting input coupled to the sense electrode and a non-inverting input coupled to a known reference voltage.

10. The touch surface device of claim 7 wherein the sense node comprises a mutually capacitive node formed at an intersection between a drive electrode and the sense electrode and the at least one non-touch-sensitive node is formed at an intersection of a compensation electrode, coupled to an output of an inverter, and the sense electrode.

11. A computer system incorporating a touch surface device, comprising:
a compensation circuit configured for receiving an output signal from a sense node on a touch-sensitive panel, generating a compensation signal, adjusting at least one parameter of the compensation signal based on a location of the sense node on the panel, and combining the compensation signal with the output signal to produce a compensated output signal;
a demodulator coupled for receiving and demodulating the compensated output signal; and
a processor coupled to receive and process the demodulated compensated output signal and perform one or more functions based on data provided by the compensated output signal.

12. The system of claim 11 wherein the at least one parameter comprises at least one of: amplitude, frequency, type of waveform and phase.

13. The system of claim 11, further comprising an amplifier having an inverting input coupled for receiving the compensated output signal and a non-inverting input coupled to a known reference voltage.

14. The system of claim 11, wherein the compensation circuit comprises:
a summing circuit having first and second inputs and an output, wherein the output signal from the sense node is received at the first input;
a digital-to-analog converter (DAC) for generating the compensation signal, the DAC having an output coupled to the second input of the summing circuit; and
a look-up table, coupled to an input of the DAC, for storing and providing a digital code to the DAC, wherein the digital code reflects the location of the sense node on the panel and the compensation signal is generated based on the digital code.

15. The system of claim 14 wherein the output signal comprises a sinusoidal waveform and the DAC generates a sinusoidal compensation signal.

16. The system of claim 11 further comprising:
a sensing circuit coupled to an output of the compensation circuit for receiving the compensated output signal and amplifying the compensated output signal with a desired gain; and
an analog-to-digital converter (ADC) coupled to the sensing circuit and configured to convert the compensated output signal into a digital signal that is provided to the processor.

17. The system of claim 16 wherein the sensing circuit comprises:
a charge amplifier having an inverting input configured to receive the compensated output signal and a non-inverting input connected to a known reference voltage; and
a feedback capacitor having one lead connected to an output of the charge amplifier and another lead connected to the inverting input.

18. The system of claim 11, wherein the combining of the compensation signal with the output signal comprises combining the compensation signal with an unmodified output signal from the touch-sensitive panel.

19. A computer system incorporating a touch surface device, comprising:
a touch-sensitive panel having a sense node for providing an output signal indicative of a touch or no-touch condition on the panel;
a drive circuit for generating a sinusoidal drive signal provided to the sense node of the touch-sensitive panel; and
at least one non-touch-sensitive node within the touch-sensitive panel, for generating a sinusoidal compensation signal, wherein the sinusoidal compensation signal is summed with the output signal to provide a sinusoidal compensated output signal;
a sensing circuit for receiving the sinusoidal compensated output signal and converting the sinusoidal compensated output signal into a digital signal; and
a processor for receiving and processing the digital signal and perform one or more functions based on the data provided by the digital signal.

20. The system of claim 19 further comprising:
an inverter for inverting the sinusoidal drive signal to generate an inverted sinusoidal drive signal, wherein the inverted sinusoidal drive signal is applied to the at least one non-touch-sensitive node, thereby generating the compensation signal at the at least one non-touch-sensitive node; and
a sense electrode, coupled to the sense node and the at least one non-touch-sensitive node, for providing the sinusoidal compensated output signal to the sensing circuit.

21. The system of claim 19 wherein the sensing circuit comprises an amplifier having an inverting input coupled to the sense electrode and a non-inverting input coupled to a known reference voltage.

22. The system of claim 19 wherein the sense node comprises a mutually capacitive node formed at an intersection between a drive electrode and the sense electrode and the at least one non-touch-sensitive node is formed at an intersection of a compensation electrode, coupled to an output of an inverter, and the sense electrode.

23. A method of minimizing mismatch between an output signal of a touch surface device and a compensation signal, comprising:
generating an output signal at a sense node of a touch-sensitive panel, wherein the output signal is indicative of a touch or no-touch condition on the panel;
combining the output signal with a compensation signal to produce a compensated output signal, wherein at least one parameter of the compensation signal is adjusted based on a location of the sense node on the panel; and
demodulating the compensated output signal.

24. The method of claim 23 wherein the at least one parameter comprises at least one of: amplitude, frequency, type of waveform and phase.

25. The method of claim 23 further comprising providing the compensated output signal to an inverting input of an amplifier, wherein a non-inverting input of the amplifier is coupled to a known reference voltage and a capacitor is coupled between an output of the amplifier and the inverting input.

26. The method of claim 23 wherein the output signal comprises a sinusoidal waveform and the compensation signal comprises a sinusoidal waveform that is substantially 180 degrees out of phase with the output signal.

27. The method of claim 23, wherein the combining of the compensation signal with the output signal comprises combining the compensation signal with an unmodified output signal.

28. A method of minimizing mismatch between an output signal of a touch surface device and a compensation signal, comprising:
providing a sinusoidal drive signal to a sense node of a touch-sensitive panel so as to generate an output signal indicative of a touch or no-touch condition on the sense node;
inverting the sinusoidal drive signal to provide a compensation drive signal; and
providing the compensation drive signal to at least one non-touch-sensitive node within the touch-sensitive panel, for generating a sinusoidal compensation signal, wherein the sinusoidal compensation signal is summed with the output signal to provide a sinusoidal compensated output signal.

29. The method of claim 28 further comprising providing the compensated output signal to an inverting input of an amplifier, wherein a non-inverting input of the amplifier is coupled to a known reference voltage and a capacitor is coupled between an output of the amplifier and the inverting input.

30. A method of minimizing mismatch effects between a compensation signal and an output signal generated by a touch surface device, comprising:
providing a sinusoidal drive signal to a first electrode of the touch surface device;
providing a sinusoidal output signal from a second electrode of the touch surface device to a first input of a summing circuit, the sinusoidal output signal being generated due to a mutual capacitance between the first and second electrodes;
providing a sinusoidal compensation signal to a second input of the summing circuit, wherein the sinusoidal compensation signal is substantially 180 degrees out of phase with the sinusoidal output signal; and
providing a compensated output signal from an output of the summing circuit to an inverting input of an amplifier, wherein a non-inverting input of the amplifier is provided with a substantially constant voltage.

31. An apparatus for minimizing mismatch between an output signal of a touch surface device and a compensation signal, comprising:
means for generating an output signal at a sense node of a touch-sensitive panel, wherein the output signal is indicative of a touch or no-touch condition on the panel;
means for combining the output signal with a compensation signal to produce a compensated output signal, wherein at least one parameter of the compensation signal is adjusted based on a location of the sense node on the panel; and
means for demodulating the compensated output signal.

32. The apparatus of claim 31, wherein the combining of the compensation signal with the output signal comprises combining the compensation signal with an unmodified output signal.

33. An apparatus for minimizing mismatch between an output signal of a touch surface device and a compensation signal, comprising:
means for providing a sinusoidal drive signal to a sense node of a touch-sensitive panel so as to generate an output signal indicative of a touch or no-touch condition on the sense node;
means for inverting the sinusoidal drive signal to provide a compensation drive signal; and
means for providing the compensation drive signal to at least one non-touch-sensitive node within the touch-sensitive panel, for generating a sinusoidal compensation signal, wherein the sinusoidal compensation signal is summed with the output signal to provide a sinusoidal compensated output signal.

34. An apparatus for minimizing mismatch effects between a compensation signal and an output signal generated by a touch surface device, comprising:
means for providing a sinusoidal drive signal to a first electrode of the touch surface device;
means for providing a sinusoidal output signal from a second electrode of the touch surface device to a first input of a summing circuit, the sinusoidal output signal being generated due to a mutual capacitance between the first and second electrodes;
means for providing a sinusoidal compensation signal to a second input of the summing circuit, wherein the sinusoidal compensation signal is substantially 180 degrees out of phase with the sinusoidal output signal; and
means for providing a compensated output signal from an output of the summing circuit to an inverting input of an amplifier, wherein a non-inverting input of the amplifier is provided with a substantially constant voltage.

* * * * *